(12) United States Patent
Fujisawa et al.

(10) Patent No.: US 7,058,462 B1
(45) Date of Patent: Jun. 6, 2006

(54) ENTERTAINMENT SYSTEM, ENTERTAINMENT APPARATUS, RECORDING MEDIUM, AND PROGRAM

(75) Inventors: Takafumi Fujisawa, Tokyo (JP); Naoto Nakai, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 988 days.

(21) Appl. No.: 09/687,497

(22) Filed: Oct. 13, 2000

(30) Foreign Application Priority Data

Oct. 14, 1999 (JP) ................................. 11-293060

(51) Int. Cl.
*G06F 17/00* (2006.01)
*G10H 7/00* (2006.01)

(52) U.S. Cl. ............................. 700/94; 84/603; 84/604
(58) Field of Classification Search .................. 463/36, 463/35; 84/602, 615, 603, 604; 715/716, 715/723; 381/119, 61, 62, 63; 700/94
See application file for complete search history.

(56) References Cited

U.S. PATENT DOCUMENTS

| | | | |
|---|---|---|---|
| 5,377,997 A | 1/1995 | Wilden et al. | |
| 5,393,073 A * | 2/1995 | Best | 463/35 |
| 5,623,112 A | 4/1997 | Ito et al. | |
| 5,627,335 A | 5/1997 | Rigopulos et al. | 84/635 |
| 5,680,534 A | 10/1997 | Yamato et al. | |
| 5,763,804 A | 6/1998 | Rigopulos et al. | 84/635 |
| 5,782,692 A | 7/1998 | Stelovsky | |
| 5,869,781 A | 2/1999 | Kurata | |
| 5,915,288 A * | 6/1999 | Gabriel | 84/609 |
| 6,011,212 A | 1/2000 | Rigopulos et al. | 84/667 |
| 6,031,174 A | 2/2000 | Takabayashi | |
| 6,066,792 A | 5/2000 | Sone | |
| 6,150,598 A | 11/2000 | Suzuki et al. | |
| 6,172,948 B1 * | 1/2001 | Keller et al. | 369/83 |
| 6,211,453 B1 | 4/2001 | Kurakake | |
| 6,274,798 B1 | 8/2001 | Suzuki et al. | 84/615 |
| 6,281,420 B1 | 8/2001 | Suzuki et al. | |
| 6,320,110 B1 | 11/2001 | Ishikawa et al. | |
| 6,353,170 B1 | 3/2002 | Eyzaguirre et al. | |
| 6,377,530 B1 * | 4/2002 | Burrows | 369/59.21 |
| 6,576,825 B1 * | 6/2003 | Yamada et al. | 84/602 |

FOREIGN PATENT DOCUMENTS

| | | |
|---|---|---|
| EP | 0 778 536 A2 | 6/1997 |
| JP | 10-149166 | 6/1988 |
| JP | 2-093498 | 4/1990 |

(Continued)

OTHER PUBLICATIONS

Japanese Patent Office, "Rejection of the Application", dated Mar. 23, 2004, for pending Japanese patent application corresponding to U.S. Appl. No. 09/687,464, 6 pages.

(Continued)

*Primary Examiner*—Huyen Le
*Assistant Examiner*—Andrew Flanders
(74) *Attorney, Agent, or Firm*—Fitch, Even, Tabin & Flannery

(57) ABSTRACT

An audio data processing means registers one of audio data extracted from a music CD as one of sound sources for an entertainment apparatus. The audio data processing means has an audio data extracting means for sampling desired audio data from the audio data introduced via an optical disk drive based on a control input entered from a manual controller, and an audio data registering means for registering the sampled audio data as one of the sound sources.

8 Claims, 26 Drawing Sheets

FOREIGN PATENT DOCUMENTS

| JP | 02-108098 | 4/1990 |
|---|---|---|
| JP | 4-068633 | 11/1992 |
| JP | 06-343764 | 12/1994 |
| JP | 07-064545 | 3/1995 |
| JP | 07-121163 | 5/1995 |
| JP | 7-271375 | 10/1995 |
| JP | 8-030270 | 2/1996 |
| JP | 8-110787 A | 4/1996 |
| JP | 08-185164 | 7/1996 |
| JP | 08-305356 | 11/1996 |
| JP | 9-325776 A | 12/1997 |
| JP | 10-149165 A | 6/1998 |
| JP | 10-171460 A | 6/1998 |
| JP | 11-015482 | 1/1999 |
| JP | 11-161271 | 6/1999 |
| JP | 11-242483 | 9/1999 |

OTHER PUBLICATIONS

A. Merck; "Steinberg Cubase Audio Sequenzer & Harddisk-Recording fur Apple Macintosh"; Keyboard, Music Media Verlag; Augsburg; Jan. 1993; pp. 112-115, 118; XP-002240715; (full 10-page English translation also included).

U.S. Appl. No. 09/687,464, filed Oct. 13, 2000, Fujisawa et al.

European Patent Office; "European Search Report"; cited in European Patent Application No. EP 00 30 9033 corresponding to related to U.S. Appl. No. 09/687,464; dated Jun. 20, 2003; pp. 1-2.

"IQS SAW, 4-Spur-Harddisk-Recording fur Windows-PC"; Keyboards, Music Media Verlag; Augsburg; Apr. 1994; pp. 148-152; XP-002240866; (full 10-page English translation also included).

A. Merck; "Steinberg Cubase Audio Sequenzer & Harddisk-Recording fur Apple Macintosh"; Keyboard, Music Media Verlag; Augsburg; Jan. 1993; pp. 112-116; XP-002240715; (full 10-page English translation also included).

Japanese Patent Office; "Rejection of the Application"; Mailing No. 218699; Mailing Date: Jul. 1, 2003; issued in a counterpart foreign application; 4 pages (including two-page English translation of portions).

"Techtv, Windows 98/ME Control Panel Features" [online]; Retrieved from the internet on <URL: http://www.techtv.com/callforhelp/howto/jump/0,24331,3413232,00.html>; XP-002237407; pp. 1-3; Retrieved from the internet on Jul. 4, 2003.

European Patent Office; "European Search Report"; cited in corresponding European Patent Application No. EP 00 30 9037; dated May 21, 2003; pp. 1-3.

Japanese Patent Office; Japanese Office Action, mailing date Oct. 1, 2002; pp. 1-2 (with English translation of portions).

European Patent Office, "Summons to Attend Oral Proceedings Pursuant to Rule 71(1) EPC", dated Jun. 30, 2005, Issued over corresponding EP Application No. 00309037.0, 4 pages.

* cited by examiner

ENTERTAINMENT SYSTEM, ENTERTAINMENT APPARATUS, RECORDING MEDIUM, AND PROGRAM

BACKGROUND OF THE INVENTION

1. Field of the Invention

The present invention relates to an entertainment system having at least one manual controller connected to an entertainment apparatus which executes various programs, for entering control requests from the user into the entertainment apparatus, an entertainment apparatus which executes various programs, a recording medium storing a program and data that are used by the entertainment system, and a program itself.

2. Description of the Related Art

Some entertainment systems including entertainment apparatus such as video game machines display video game images based on video game data stored in a recording medium such as a CD-ROM or the like on the display screen of a television receiver while allowing the user or game player to play the video game with commands entered via a manual controller.

In those entertainment systems, the entertainment apparatus and the manual controller are usually connected to each other by a serial interface. When a clock signal is supplied from the entertainment apparatus to the manual controller, the manual controller sends key switch information based on the user's control entries in synchronism with the clock signal.

Recently developed manual controllers incorporate a vibration generating means for applying vibrations to the user based on a request from an external apparatus such as an entertainment apparatus, for example. While a video game is in progress, the vibration generating means applies various different kinds of vibrations to the user in response to user's different control entries.

Almost all video games that can be played on the above entertainment system output BGM. (BackGround Music) using a predetermined sound source.

If audio data supplied from music compact discs (CDs) or via a network can be used as a BGM sound source for video games, then a wide variety of existing music data is made available for use in video games, providing an additional element of interest for video games.

SUMMARY OF THE INVENTION

It is therefore an object of the present invention to provide an entertainment system, an entertainment apparatus, a recording medium, and a program which allow audio data supplied from music CDs or via a network to be used as a BGM sound source for the entertainment apparatus, thus providing an additional element of interest for video games.

According to the present invention, an entertainment system comprises an entertainment apparatus for executing various programs, at least one manual controller for entering control requests from the user into the entertainment apparatus, audio output means for selecting and outputting one of a plurality of sound sources based on a supplied sound output command, a display unit for displaying images outputted from the entertainment apparatus, and audio data processing means for registering extracted one of audio data introduced from an external source as one of the sound sources for the entertainment apparatus.

According to the present invention, an entertainment apparatus for connection to a manual controller for outputting at least a control request from the user, a display unit for displaying images, and audio output means for selecting and outputting one of a plurality of sound sources based on a supplied sound output command, comprising audio data processing means for registering extracted one of audio data introduced from an external source as one of the sound sources.

According to the present invention, there is also provided a recording medium storing a program and data for use in an entertainment system having an entertainment apparatus for executing various programs, at least one manual controller for entering control requests from the user into the entertainment apparatus, audio output means for selecting and outputting one of a plurality of sound sources based on a supplied sound output command, and a display unit for displaying images outputted from the entertainment apparatus, the program comprising the step of registering extracted one of audio data introduced from an external source as one of the sound sources for the entertainment apparatus.

According to the present invention, there is also provided a program readable and executable by a computer, for use in an entertainment system having an entertainment apparatus for executing various programs, at least one manual controller for entering control requests from the user into the entertainment apparatus, audio output means for selecting and outputting one of a plurality of sound sources based on a supplied sound output command, and a display unit for displaying images outputted from the entertainment apparatus, the program comprising the step of registering extracted one of audio data introduced from an external source as one of the sound sources for the entertainment apparatus.

With the above arrangement, audio data introduced from a music CD or via a network can be used as a sound source for the entertainment apparatus, providing an additional element of musical interest to video games that are played back on the entertainment apparatus. The audio data processing means or step may comprise audio data extracting means for, or the step of, extracting audio data from the audio data introduced from the external source based on a control input entered from the manual controller, and audio data registering means for, or the step of, registering the extracted audio data as one of the sound sources.

The audio data processing means or step may comprise trimming means for, or the step of, trimming an excessive portion off the extracted audio data. Since unwanted data can be cut off from the extracted audio data, only impressive audio data can be used as a sound source.

The audio data processing means or step may comprise effect applying means for, or the step of, applying an effect to the extracted audio data. Thus, even one form of audio data can be modified into different forms of audio data by applying various effects, resulting in a variety of sound sources available.

The audio data processing means or step may comprise audio data re-extracting means for, or the step of, re-extracting audio data from the extracted audio data. Consequently, the user can extract only favorite portions from the audio data to which various effects have been applied or the audio data from which unwanted portions have been removed. Therefore, the quality of audio data for use as sound sources can be increased, and the process of extracting audio data is easy.

The audio data re-extracting means or step may comprise selecting playback means for reproducing the extracted audio data according to a playback attribute selected according to a control input entered from the manual controller. Therefore, the audio data can be varied in various playback modes such as the reverse playback mode and the skipping playback mode, resulting in a variety of sound sources available.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An entertainment system and an entertainment apparatus according to the present invention as applied to a video game apparatus, and a recording medium and a program according to the present invention as applied to a recording medium which stores a program and data to be executed by the video game apparatus and a program to be executed by the video game apparatus will be described below with reference to FIGS. 1 through 26.

Figure 1:
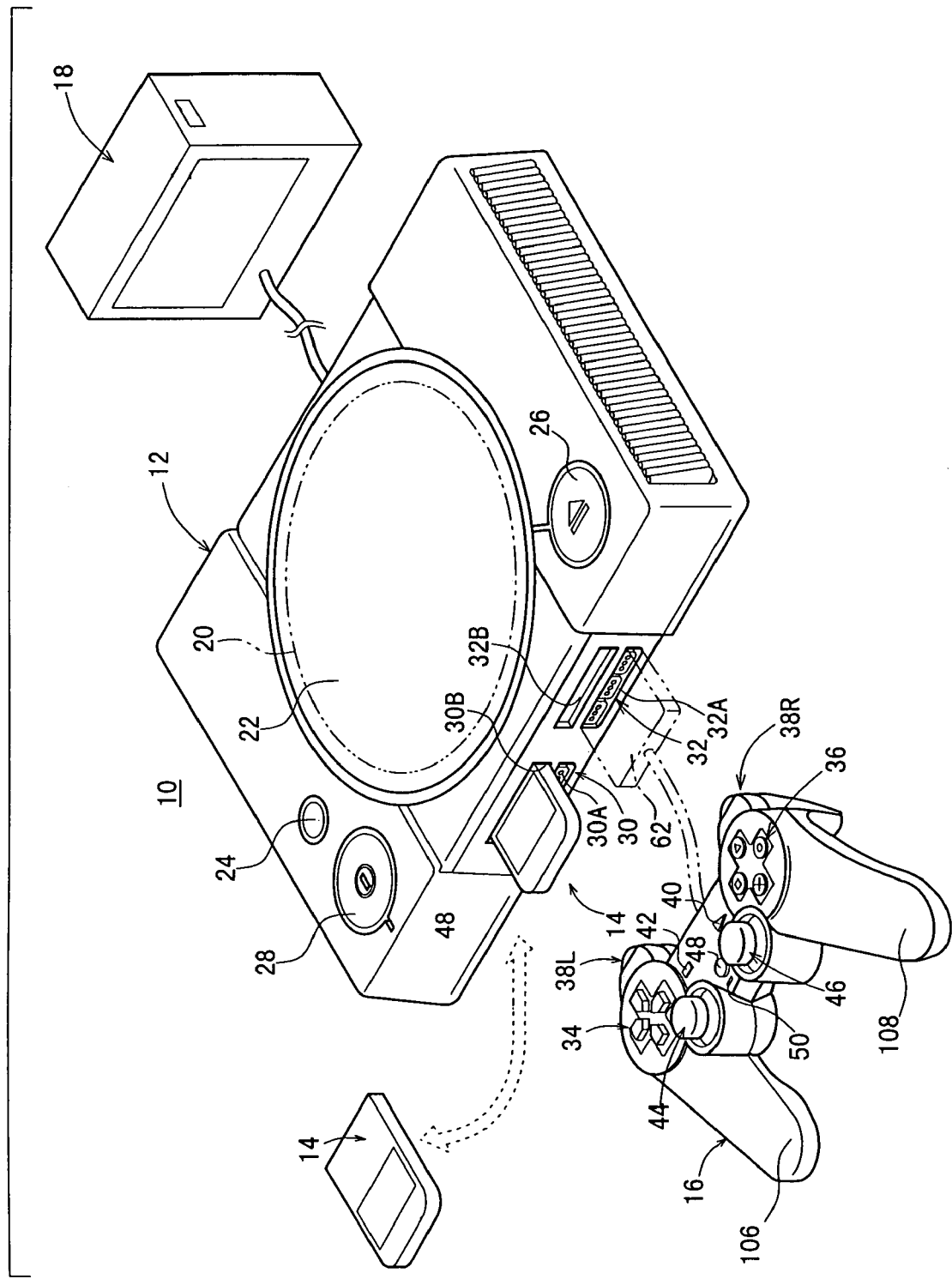
FIG. 1 is a perspective view of an entertainment system according to the present invention.

As shown in FIG. 1, an entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a display monitor 18 such as a television receiver which is supplied with video and audio output signals from the entertainment apparatus 12.

The entertainment apparatus 12 reads a program recorded in a mass storage medium such as an optical disk 20 such as a CD-ROM or the like, and executes a game, for example, based on the program depending on commands supplied from the user, e.g., the game player, via the manual controller 16. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 for supplying an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk 20 as the recording medium.

The slots 30, 32 have respective upper slot units 30B, 32B and respective lower slots units 30A, 32A. Two manual controllers 16 may be connected respectively to the lower slots units 30A, 32A, and memory cards 14 or portable information terminals (not shown) having the function of the memory card 14 for storing flags indicative of interim game data may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

Figure 2:
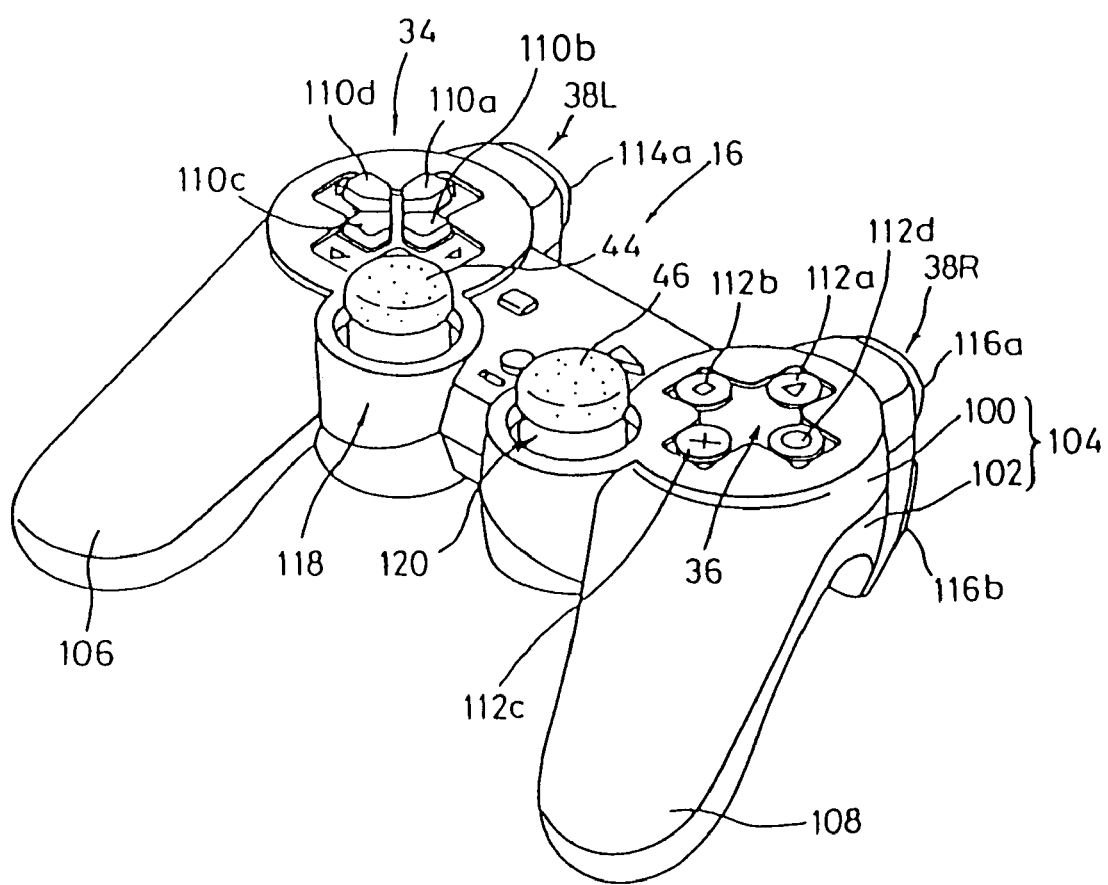
FIG. 2 is a perspective view of a manual controller.
Figure 3:
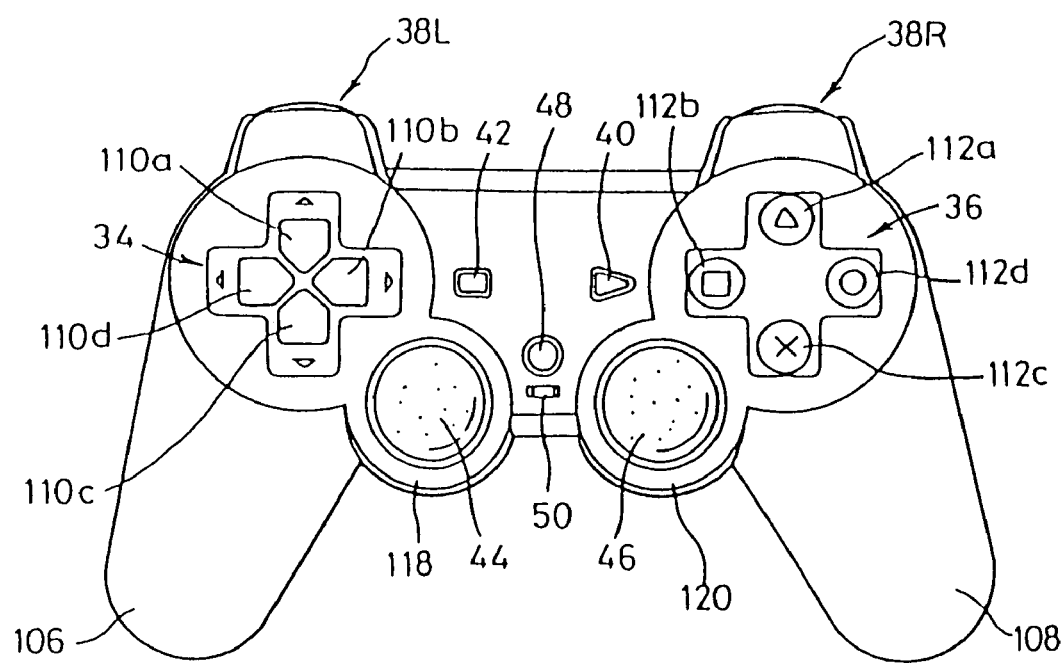
FIG. 3 is a plan view of the manual controller.

As shown in FIGS. 2 and 3, the manual controller 16 has first and second control pads 34, 36, an L (Left) button 38L, an R (Right) button 38R, a start button 40, and a selection button 42. The manual controller 16 also has joysticks 44, 46 for inputting analog control actions, a mode selection switch 48 for selecting control modes of the joysticks 44, 46, and a mode indicator 50 for indicating a selected control mode. The mode indicator 50 comprises a light-emitting element such as a light-emitting diode or the like.

As shown in FIG. 2, the manual controller 16 has a housing 104 comprising an upper member 100 and a lower member 102 which are mated and joined to each other by fasteners such as screws.

As shown in FIGS. 2 and 3, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 3, the left and right grips 106, 108 are progressively spaced away from each other toward their distal ends. To allow the game player to grip the left and right grips 106, 108 comfortably for a long period of time, the left and right grips 106, 108 are tapered from their joint with the housing 104 toward their distal ends, and have arcuate outer peripheral surfaces and arcuate distal end surfaces.

As shown in FIGS. 2 and 3, the first control pad 34 is disposed on one end of the housing 104 and comprises a first pressable control member (up button) 110a, a second pressable control member (right button) 110b, a third pressable control member (down button) 110c, and a fourth pressable control member (left button) 110d. The first through fourth pressable control members 110a, 110b, 110c, 110d project on an upper surface of the housing 104 and are arranged in a crisscross pattern.

The first control pad 34 includes switch elements as signal input elements associated respectively with the first through fourth pressable control members 110a, 110b, 110c, 110d. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 2 and 3, the second control pad 36 is disposed on the other end of the housing 104 and comprises a first pressable control member (Δ button) 112a, a second pressable control member (□ button) 112b, a third pressable control member (X button) 112c, and a fourth pressable control member (○ button) 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 4:
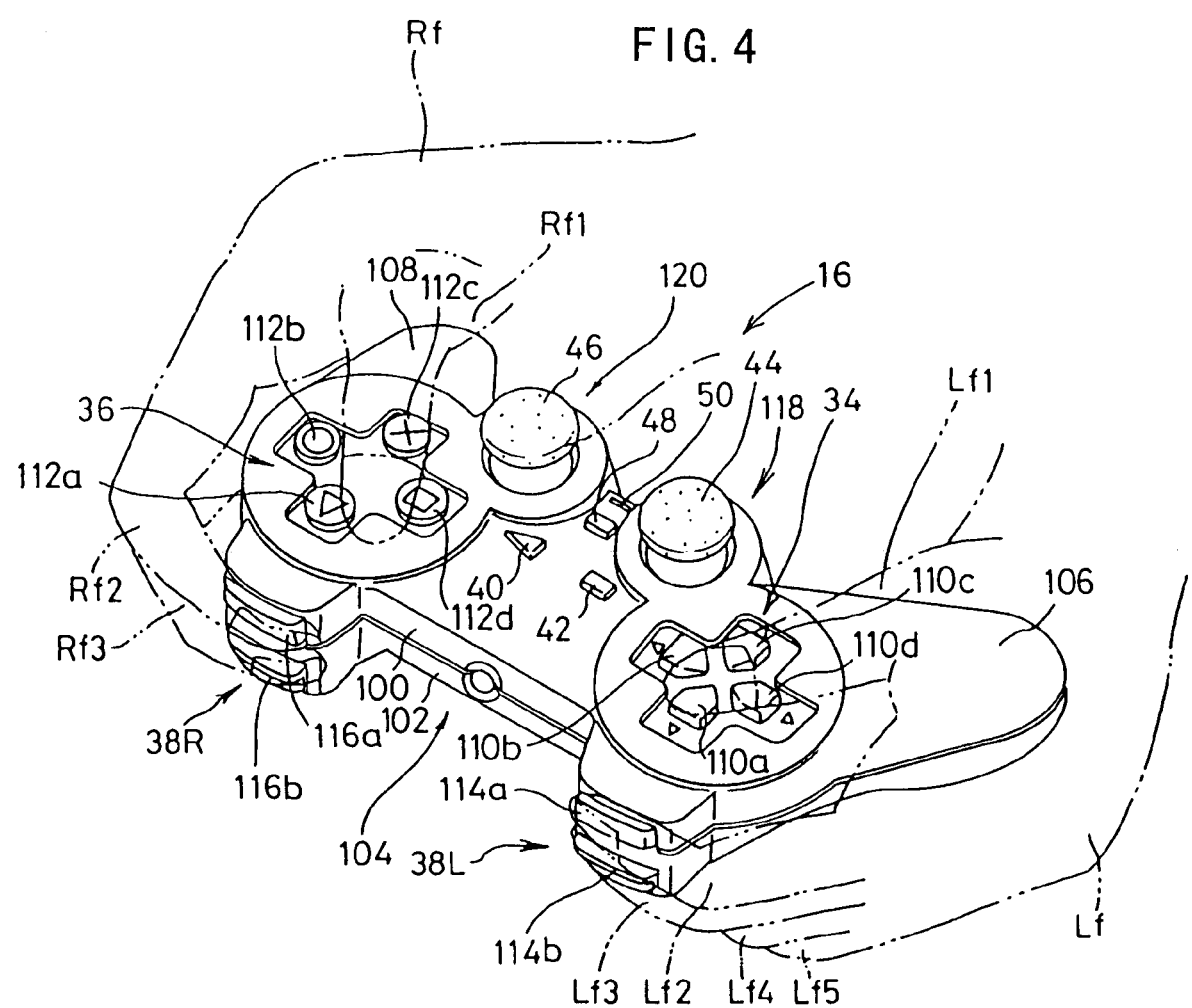
FIG. 4 is a perspective view showing the manner in which the manual controller is used.

The L button 38L and the R button 38R are disposed on a side of the housing 104 remote from the left and right grips 106, 108 and positioned respectively at the opposite ends of the housing 104. As shown in FIGS. 2 and 4, the L button 38L has a first left pressable control member (L1 button) 114a and a second left pressable control member (L2 button) 114b, and the R button 38R has a first right pressable control member (R1 button) 116a and second right pressable control member (R2 button) 116b, respectively.

The L button 38L and the R button 38R have respective switch elements associated respectively with the pressable control members (the L1 button 114a, the L2 button 114b, the R1 button 116a, and the R2 button 116b).

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 2 and 3, the manual controller 16 also has first and second analog control pads 118, 120 disposed respectively at confronting corners defined between the housing 104 and the proximal ends of the left and right grips 106, 108 which are joined to the housing 104.

The first and second analog control pads 118, 120 have the respective joysticks 44, 46 which can be tilted in all directions (360°) about control shafts thereof, and respective signal input elements such as variable resistors or the like which are operable by the respective joysticks 44, 46. Specifically, the control shafts of the left and right joysticks 44, 46 are normally urged to return to their neutral positions by biasing members. The left and the right joysticks 44, 46 can be freely tilted in all directions (360°) about the axes of the control shafts.

The first and second analog control pads 118, 120 can move a displayed game character while rotating the same or while changing its speed, and can make an analog-like action such as to change the form of a displayed character, when the game player manipulates the joysticks 44, 46. Therefore, the first and second analog control pads 118, 120 are used as a control unit for entering command signals for a displayed character to perform the above movement or action.

When the mode selection switch 48 is pressed, it can select a control mode for allowing a command signal to be inputted from the first and second analog control pads 118, 120 or a control mode for inhibiting a command signal from being inputted from the first and second analog control pads 118, 120.

When the mode selection switch 48 is pressed, the functions of the first through fourth pressable control members 112a, 112b, 112c, 112d of the second control pad 36, and the functions of the pressable control members 114a, 114b and 116a, 116b of the L button 38L and the R button 38R are changed depending on the control mode selected by the pressed mode selection switch 48. Depending on the control mode selected by the mode selection switch 48, the mode indicator 50 flickers and changes its indication light.

As shown in FIG. 4, the left and right grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 4, when the first and second grips 106, 108 are gripped respectively by the palms of the hands of the game player, the thumbs Lf1, Rf1 of the left and right hands can extend over the joysticks 44, 46 of the first and second analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the first and second analog control pads 118, 120 are positioned in confronting relation to the proximal ends of the left and right grips 106, 108 which are joined to the housing 104, when the left and right grips 106, 108 are gripped by the left and right hands, the joysticks 44, 46 are positioned most closely to the thumbs Lf1, Rf1, respectively. Therefore, the joysticks 44, 46 can easily be manipulated by the thumbs Lf1, Rf1.

As shown in FIG. 4, when the left and right grips 106, 108 are gripped respectively by the palms of the hands of the game player, the index fingers Lf2, Rf2 and middle fingers Lf3, Rf3 of the left and right hands can extend over positions where they can selectively press the L1 button 114a, L2 button 114b of the L button 38L and R1 button 116a, R2 button 116b of the R button 38R.

Figure 5:
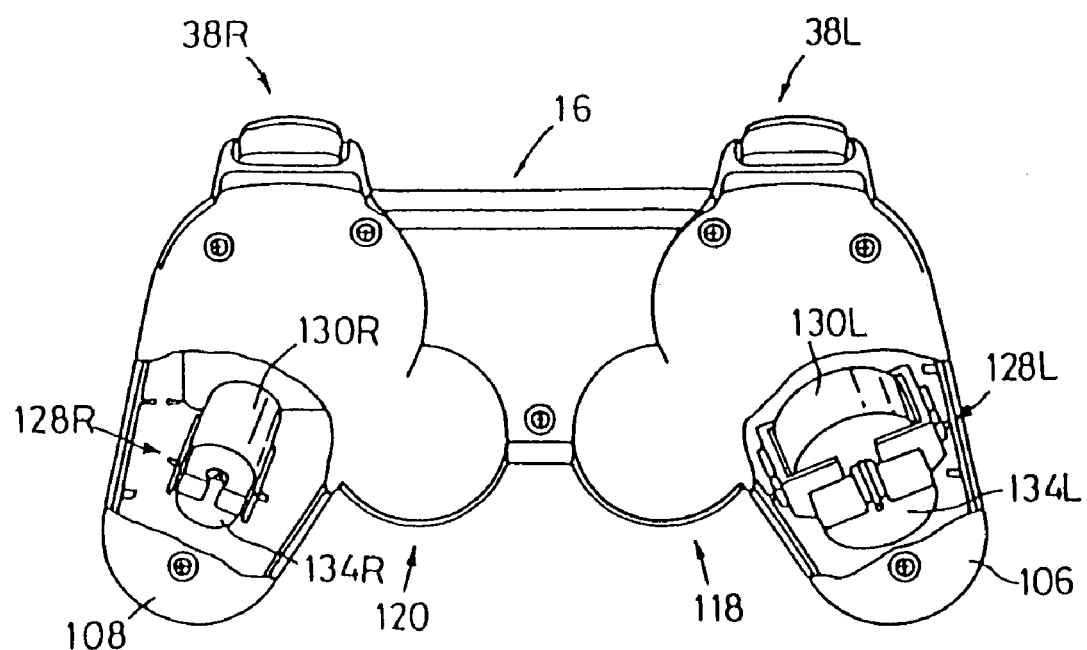
FIG. 5 is a bottom view, partly broken away, of the manual controller, showing vibration imparting mechanisms disposed respectively in left and right grips thereof.

As shown in FIG. 5, the manual controller 16 has a pair of vibration imparting mechanisms 128L, 128R for imparting vibrations to the user in order for the user to be able to play a highly realistic game.

As shown in FIG. 5, the left and right vibration imparting mechanisms 128L, 128R are positioned near the proximal ends of the left and right grips 106, 108 that are held by the hands and fingers when the manual controller 16 is gripped by the user.

Since the both vibration imparting mechanisms 128L, 128R have basically the same structure except their vibration characteristics, only the right vibration imparting mechanism 128R will be described for the purpose of brevity.

The vibration imparting mechanisms 128R comprises a motor 130R energizable by a vibration generating command supplied from the entertainment apparatus 12, and an eccentric member 134R mounted eccentrically on the drive shaft of the motor 130R.

The eccentric member 134R comprises a weight in the form of a heavy metal member having a semicircular cross-sectional shape. The weight has an off-center hole defined therein in which the drive shaft of the motor 130R is fitted.

According to the vibration imparting mechanisms 128L, 128R as constructed above, when the motors 130L, 130R are energized, the drive shafts thereof rotate to cause the eccentric members 134L, 134R to rotate in an eccentric motion for thereby generating vibrations, which are imparted to the left grip 106 and the right grip 108. Then, the vibrations of the left grip 106 and the right grip 108 are applied to the hands and fingers of the user.

Next, the vibration characteristics of the vibration imparting mechanisms 128L, 128R disposed in the left grip 106 and the right grip 108 respectively will be described hereinbelow.

The vibration imparting mechanisms 128L, 128R have the different vibration characteristics.

For example, the motor 130L of the left vibration imparting mechanism 128L is bigger than the motor 130R of the right vibration mechanism 128R. The rotational speed of the motor 130L varies according to a vibration value included in a vibration generating command transmitted from the entertainment apparatus 12. That is, vibrations having different frequencies can be generated depending on the vibration value. In the present embodiment, the vibration frequency of the motor 130L varies in proportion to the vibration value.

In contrast to the motor 130L of the left vibration mechanism 128L, the vibration frequency of the motor 130R of the right vibration mechanism 128R does not vary according to the vibration value included in the vibration generating command. The motor 130R of the right vibration mechanism 128R is simply either energized or de-energized according to the vibration value. If the vibration value (logic value) is "1", the motor 130R of the right vibration mechanism 128R is energized. If the vibration value is "0", the motor 130R of the right vibration mechanism 128R is de-energized. When the motor 130R of the right vibration mechanism 128R is energized, it rotates at a constant speed to generate vibrations at a constant frequency.

In order to energize the motors 130L, 130R to vibrate the manual controller 16 in its entirety, a bidirectional communication function needs to be provided between the manual controller 16 and the entertainment apparatus 12. This bidirectional communication function will be described later on.

Now, circuit arrangements of the entertainment apparatus 12 and the manual controller 16 will be described below with reference to FIGS. 6 through 8.

Figure 6:
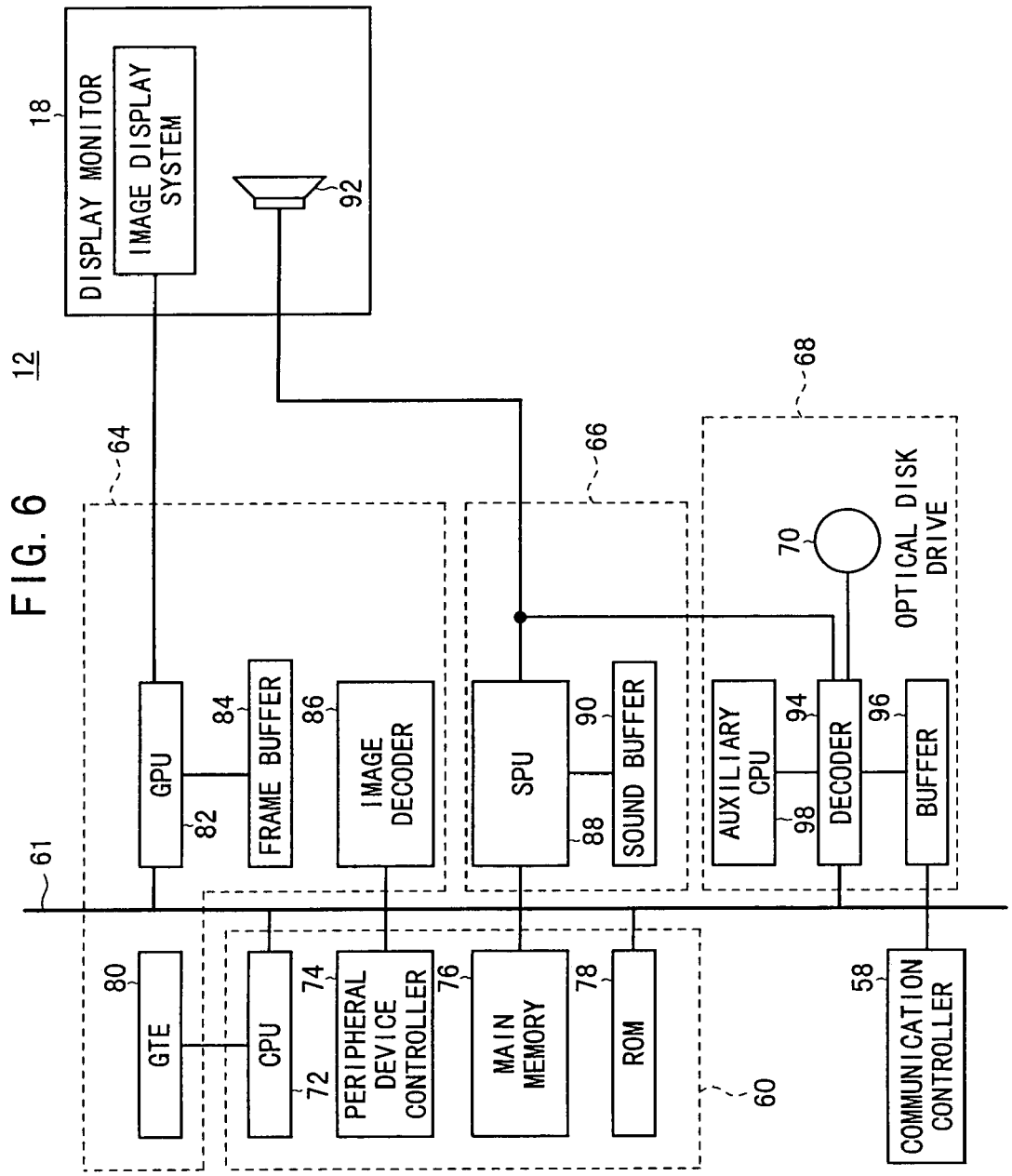
FIG. 6 is a block diagram of a circuit arrangement of an entertainment apparatus.

As shown in FIG. 6, the entertainment apparatus 12 generally comprises a control system 60, a graphic generating system 64 connected to the control system 60 via a system bus 61, a sound generating system 66 connected to the control system 60 via the system bus 61, and an optical disk control system 68 connected to the control system 60 via the system bus 61. A communication controller 58 for controlling data to be inputted to and outputted from the manual controller 16 and the memory card 14 is also connected to the control system 60 via the system bus 61.

The manual controller 16 supplies commands (including control data) from the user via a communication controller 150 (see FIG. 7) of the manual controller 16 and the communication controller 58 to the entertainment apparatus 12. The optical disk control system 68 includes an optical disk drive 70 in which the optical disk 20, which may comprise a CD-ROM or the like as a specific example of a recording medium according to the present invention.

The control system 60 controls motions of characters displayed on the monitor 18 based on a program and data read from the optical disk 20 and commands supplied from the manual controller 16.

The control system 60 includes a central processing unit (CPU) 72, a peripheral device controller 74 for controlling interrupts and direct memory access (DMA) data transfer, a main memory 76 comprising a random-access memory (RAM), and a read-only memory (ROM) 78 which stores various programs such as an operating system for managing the graphic generating system 64, the sound generating system 66, etc. The main memory 76 can store at least a game program that is supplied from the optical disk 20 and executed by the central processing unit 72.

The CPU 72 controls the entertainment apparatus 12 in its entirety by executing the operating system stored in the ROM 78. The CPU 72 comprises a 32-bit RISC-CPU, for example.

When the entertainment apparatus 12 is turned on, the CPU 72 executes the operating system stored in the ROM 78 to start controlling the graphic generating system 64, the sound generating system 66, etc.

When the operating system is executed, the CPU 72 initializes the entertainment apparatus 12 in its entirety for confirming its operation, and thereafter controls the optical disc control system 68 to execute an application program such as a game program recorded in the optical disk 20.

As the application program such as a game program is executed, the CPU 72 controls the graphic generating system 64, the sound generating system 66, etc. depending on commands entered from the user for thereby controlling the display of images and the generation of music sounds and sound effects.

The graphic generating system 64 comprises a geometry transfer engine (GTE) 80 for performing coordinate transformations and other processing, a graphic processing unit (GPU) 82 for rendering image data according to instructions from the CPU 72, a frame buffer 84 for storing image data rendered by the GPU 82, and an image decoder 86 for decoding image data compressed and encoded by an orthogonal transform such as a discrete cosine transform.

The GTE 80 has a parallel arithmetic mechanism for performing a plurality of arithmetic operations parallel to each other, and can perform coordinate transformations and light source calculations, and calculate matrixes or vectors at a high speed in response to a request from the CPU 72.

Specifically, the GTE 80 can calculate the coordinates of a maximum of 1.5 million polygons per second for a flat shading process to plot one triangular polygon with one color, for example. With the GTE 80, the entertainment apparatus 12 is able to reduce the burden on the CPU 72 and perform high-speed coordinate calculations.

According to an image generating instruction from the CPU 72, the GPU 82 generates and stores the data of a polygon or the like in the frame buffer 84. The GPU 82 is capable of generating and storing a maximum of 360 thousand polygons per second.

The frame buffer 84 comprises a dual-port RAM, and is capable of simultaneously storing image data generated by the GPU 82 or image data transferred from the main memory 76, and reading image data for display. The frame buffer 84 has a storage capacity of 1 Mbytes, for example, and is handled as a 16-bit matrix made up of a horizontal row of 1024 pixels and a vertical column of 512 pixels.

The frame buffer 84 has a display area for storing image data to be outputted as video output data, a CLUT (color look-up table) area for storing a color look-up table which will be referred to by the GPU 82 when it renders a polygon or the like, and a texture area for storing texture data to be subjected to coordinate transformations when a polygon is generated and mapped onto a polygon generated by the GPU 82. The CLUT area and the texture area are dynamically varied as the display area is varied.

The GPU 82 can perform, in addition to the flat shading process, a Gouraud shading process for determining colors in polygons by interpolating intensities from the vertices of the polygons, and a texture mapping process for mapping textures stored in the texture area onto polygons. For performing the Gouraud shading process or texture mapping process, the GTE 80 can perform coordinate calculations for a maximum of about 500,000 polygons per second.

The image decoder 86 is controlled by the CPU 72 to decode image data of a still or moving image stored in the main memory 76, and store the decoded image into the main memory 76.

Image data reproduced by the image decoder 86 is transferred to the frame buffer 84 by the GPU 82, and can be used as a background for an image plotted by the GPU 82.

The sound generating system 66 comprises a sound processing unit (SPU) 88 for generating music sounds, sound effects, etc. based on instructions from the CPU 72, and a sound buffer 90 for storing music sounds, sound effects, etc. generated by the SPU 88. Audio signals representing music sounds, sound effects, etc. generated by the SPU 88 are supplied to audio terminals of the monitor 18. The monitor 18 has a speaker 92 which radiates music sounds, sound effects, etc. generated by the SPU 88 based on the supplied audio signals.

The SPU 88 has an ADPCM (adaptive differential PCM) function for reproducing 16-bit audio data which has been encoded as 4-bit differential audio data by ADPCM, a reproducing function for reproducing waveform data stored in the sound buffer 90 to generate sound effects, etc., and a modulating function for modulating and reproducing the waveform data stored in the sound buffer 90.

The sound system 66 with these functions can be used as a sampling sound source which generates music sounds, sound effects, etc. based on the waveform data stored in the sound buffer 90 according to instructions from the CPU 72.

The optical disk control system 68 comprises an optical disk drive 70 for reproducing application programs and data recorded on the optical disk 20, a decoder 94 for decoding programs and data that are recorded with an error correcting code added thereto, and a buffer 96 for temporarily storing data read from the optical disk drive 70 so as to allow the data from the optical disk 20 to be read at a high speed. An auxiliary CPU 98 is connected to the decoder 94.

Audio data recorded on the optical disk 20 which is read by the optical disk drive 70 includes PCM data converted from audio signals, in addition to the ADPCM data.

The ADPCM data, which is recorded as 4-bit differential data of 16-bit digital data, is decoded by the decoder 94, supplied to the SPU 88, converted thereby into audio signals, and applied to drive the speaker 92.

The PCM data, which is recorded as 16-bit digital data, is decoded by the decoder 94 and then applied to drive the speaker 92.

Figure 7:
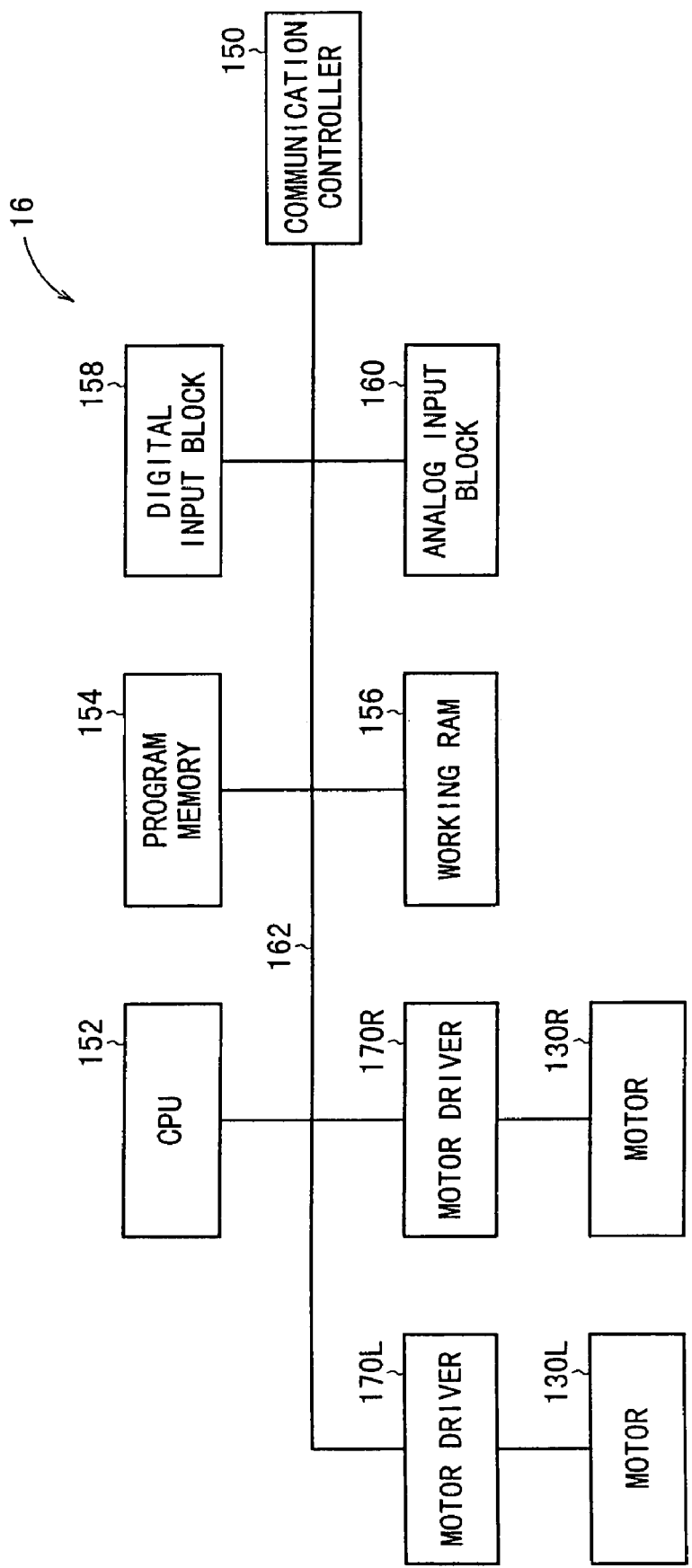
FIG. 7 is a block diagram of the manual controller.

As shown in FIG. 7, the manual controller 16 comprises a communication controller 150, a CPU 152, a program memory 154, a working RAM 156, a digital input block 158, an analog input block 160, a left motor driver 170L for energizing the left motor 130L, and a right motor driver 170R for energizing the right motor 130R. These components of the communication controller 16 are connected to a bus 162.

The digital input block 158 functions as a manual input controller for the pressable control members 110a–110d of the first control pad 34 and the pressable control members 112a–112d of the second control pad 36. The analog input block 160 functions as a manual input controller for the left and right joysticks 44, 46. The digital input block 158 and the analog input block 160 allow the user to enter various items of information into the manual controller 16.

The communication controller 150 has a function to effect serial communications with an external device. The communication controller 150 is electrically connectable to the communication controller 58 (see FIG. 6) of the entertainment apparatus 12, for example, for data communications with the entertainment apparatus 12.

Figure 8:
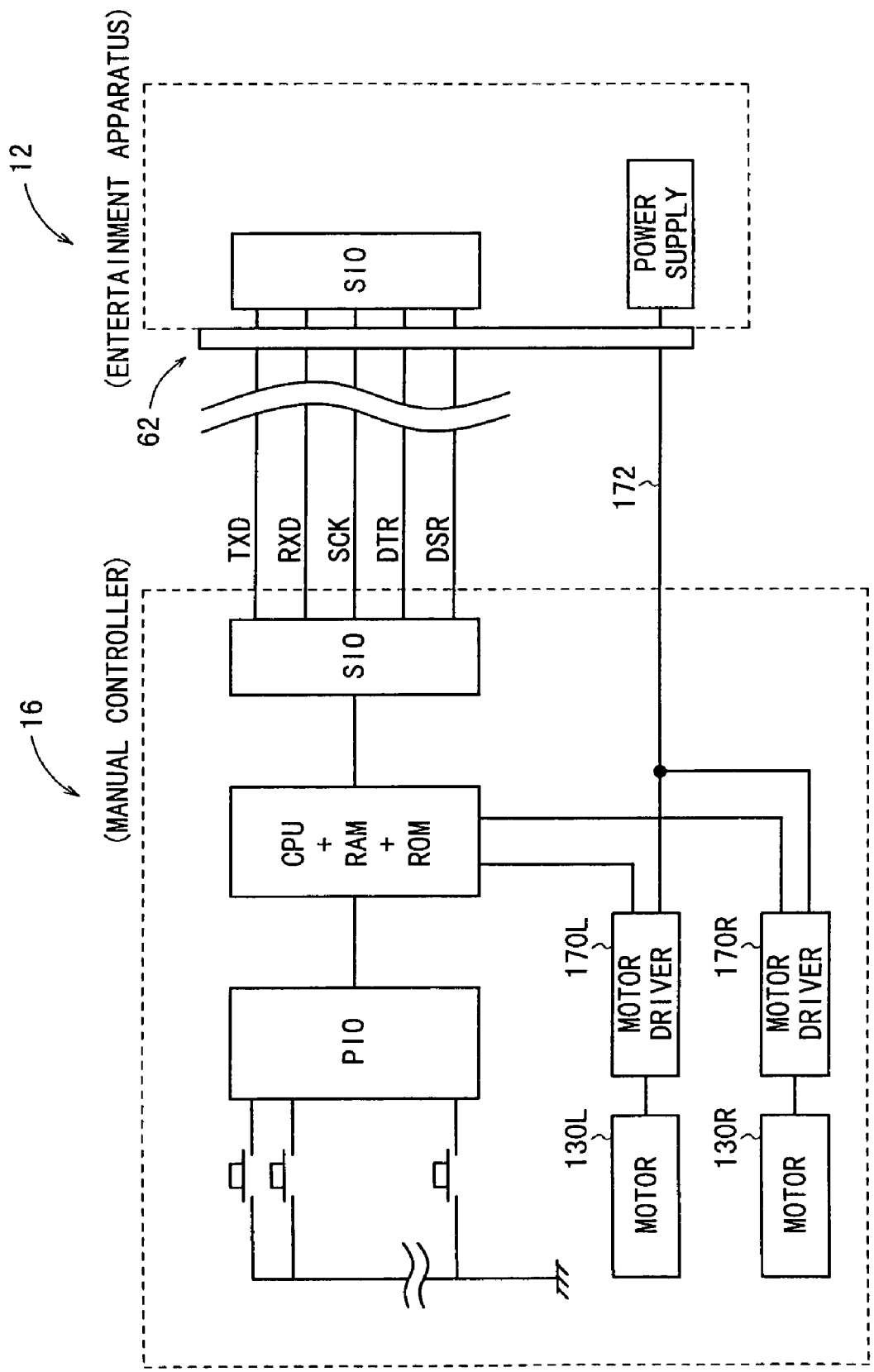
FIG. 8 is a block diagram of components for carrying out bidirectional serial communications between the manual controller and the entertainment apparatus.

As shown in FIG. 8, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering control data from a plurality of control buttons, a one-chip microcomputer comprising a CPU, a RAM, and a ROM, and a pair of motor drivers 170R, 170L for energizing the motors 130R, 130L of the vibration imparting mechanisms 128R, 128L. Each of the motors 130R, 130L is energized by a voltage and a current supplied from the motor drivers 170R, 170L.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the entertainment apparatus 12 and the manual controller 16. Other detailed structure of the entertainment apparatus 12 are omitted from illustration in FIG. 8.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

As shown in FIG. 8, the signal and control lines for bidirectional serial communication are accommodated in a cable. This cable further includes a power line 172 extending from a power supply in the entertainment apparatus 12 and connected to the motor drivers 170R, 170L in the manual controller 16 for supply electric energy to energize the motors 130R, 130L.

A process of bidirectional serial communication between the entertainment apparatus 12 and the manual controller 16 will be described below. In order for the entertainment apparatus 12 to communicate with the manual controller 16 to read control data from the digital input block 158 and the analog input block 160, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends control data via the data transfer signal line TXD to the manual controller 16, which sends control data from the digital input block 158 and the analog input block 160 via the data transfer signal line RXD to the entertainment apparatus 12. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly control data from the digital input block 158 and the analog input block 160 to the entertainment apparatus 12, and the entertainment apparatus 12 can send vibration generating commands for energizing the motors 130R, 130L of the vibration imparting mechanisms 128R, 128L via the data transfer signal line TXD to the manual controller 16.

The vibration generating commands for energizing the motors 130R, 130L include those which have been established in advance in the optical disk 20 set in the entertainment apparatus 12 and those which are newly generated in the entertainment apparatus 12.

A characteristic function of the entertainment system 10 according to the present embodiment will be described below with reference to FIGS. 9 through 26.

According to the characteristic function, audio data extracted from audio data introduced from an external source is registered as one of sound sources for the entertainment apparatus 12.

Specifically, audio data from the optical disk 20 loaded in the optical disk drive 70 of the entertainment apparatus 12 or a network connected to the entertainment apparatus 12 is introduced, and desired audio data is extracted from the introduced audio data and used as a sound source for the entertainment apparatus 12. In this embodiment, audio data is introduced from a music CD (Compact Disc) loaded in the optical disk drive 70.

Figure 9:
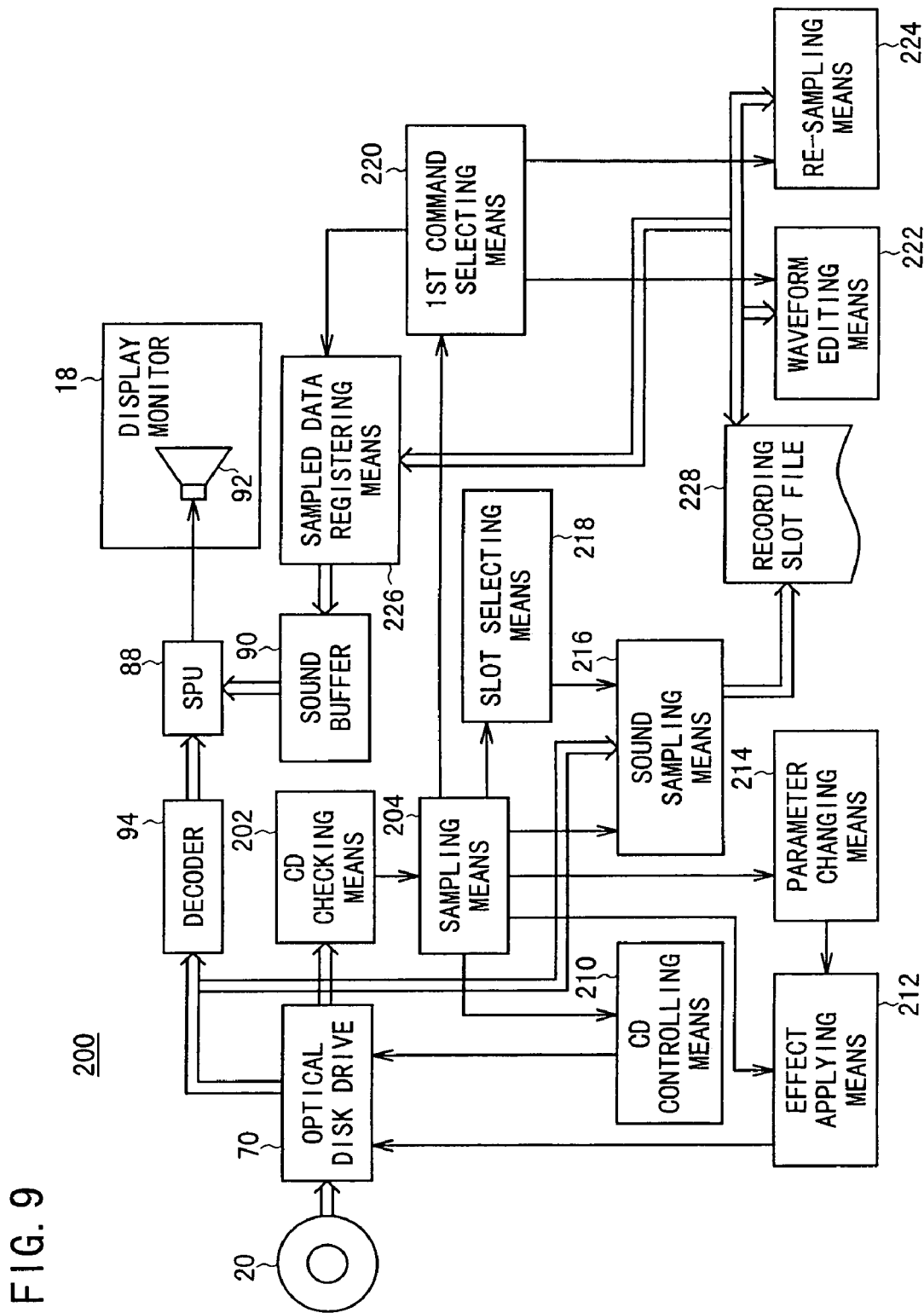
FIG. 9 is a functional block diagram of a audio data processing means including a sampling means.

One example of software for performing the above characteristic function will be described below with reference to FIGS. 9 through 26. As shown in FIG. 9, the software comprises a audio data processing means 200.

The audio data processing means 200 can be supplied to the entertainment system 10 from a randomly accessible recording medium such as a CD-ROM, the memory card 14, or a network. It is assumed in the present embodiment that the audio data processing means 200 is read from the optical disk 20 such as a CD-ROM into the entertainment apparatus 12.

The audio data processing means 200 is downloaded in advance from the optical disk 20 played back by the entertainment apparatus 12 into the main memory 76 in the control system 60 thereof according to a predetermined process, and executed by the CPU 72 of the control system 60.

As shown in FIG. 9, the audio data processing means 200 has a CD checking means 202 for checking whether the optical disk 20 loaded in the optical disk drive 70 is a music CD or not, and a sampling means 204 for sampling any desired music data from audio data introduced when a music CD is played back.

The sampling means 204 comprises a CD controlling means 210 for controlling the optical disk drive 70 to play, stop, access tracks (forward and backward) of, and otherwise operate a music CD loaded in the optical disk drive 70 in response to control inputs from the manual controller 16, an effect applying means 212 for applying various effects to reproduced music data from the music CD in response to control inputs from the manual controller 16, a parameter changing means 214 for changing parameters including an effect level, a sound volume, etc. of audio data in response to control inputs from the manual controller 16, a sound sampling means 216 for sampling audio data of a portion of the reproduced audio data which is determined by a control input from the manual controller 16 and registering the sampled audio data in a predetermined recording time slot, a slot selecting means 218 for selecting a recording slot to register sampled audio data therein, and a first command selecting means 220 for selecting various commands after music data is sampled.

The effect applying means 212 controls the optical disk drive 70 to apply a necessary effect to reproduced audio data.

The first command selecting means 220 comprises a waveform editing means 222 for removing excessive data from sampled audio data, a re-sampling means 224 for re-sampling desired audio data from sampled audio data, and a sampled data registering means 226 for registering sampled audio data in a audio data file in the sound buffer 90.

A number of audio data registered in the audio data file serve as sound source data for use by the entertainment apparatus 12. When sampled audio data is registered in the audio data file by the sampled data registering means 226, the sampled audio data is available as a sound source for the entertainment apparatus 12.

The sound sampling means 216 uses a recording slot file 228 which has six records corresponding to respective six recording slots, for example, that are handled by the sound sampling means 216. Each of the six records of the recording slot file 228 stores sampled audio data.

Figure 10:
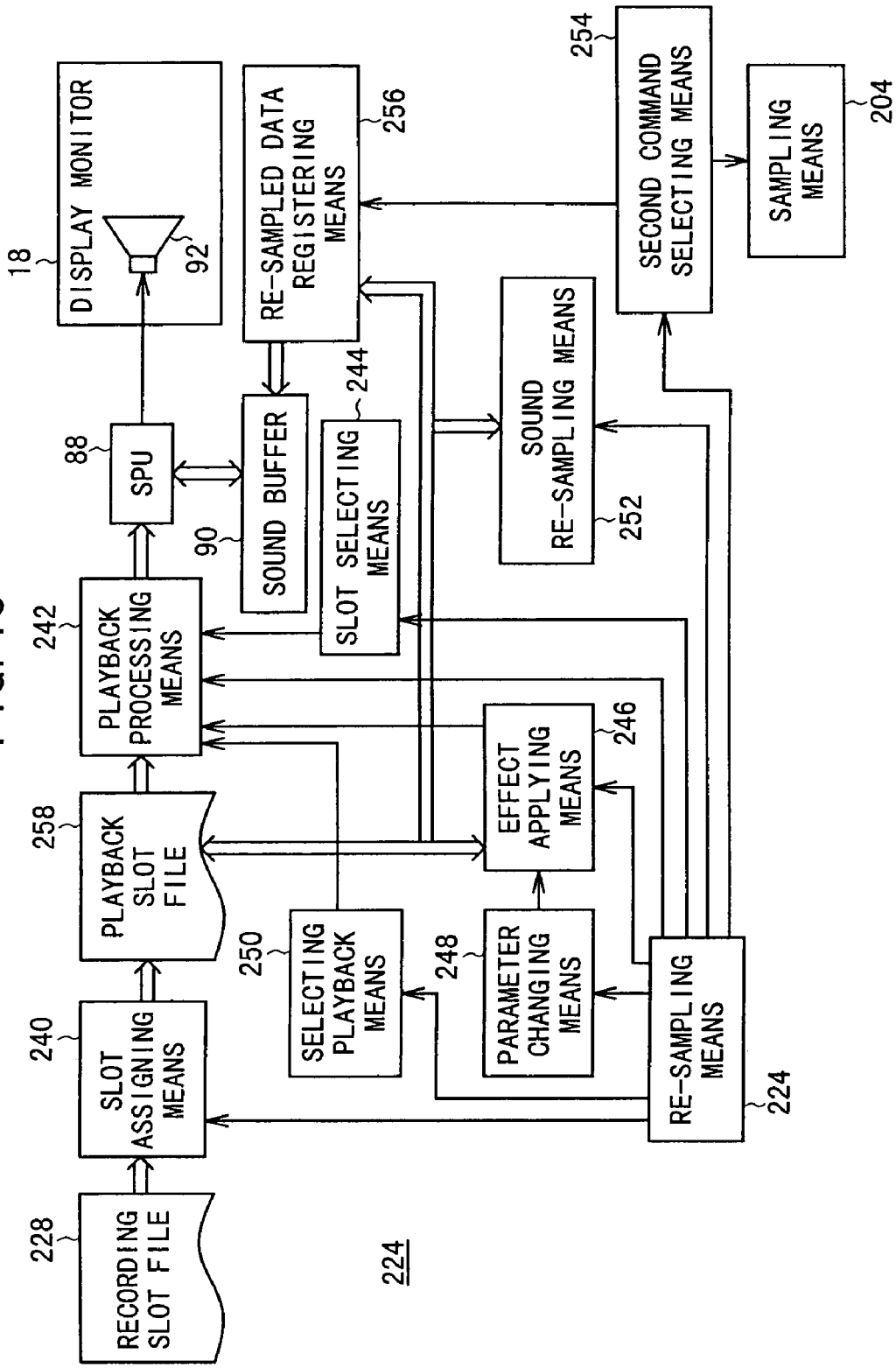
FIG. 10 is a functional block diagram of a re-sampling means in the audio data processing means.

As shown in FIG. 10, the re-sampling means 224 comprises a slot assigning means 240 for selecting a recording slot to be assigned to a playback time slot (playback slot) for re-sampling, a playback processing means 242 for reproducing audio data assigned to playback slots, a slot selecting means 244 for selecting a playback slot to be played back, an effect applying means 246 for applying various effects to reproduced audio data in response to control inputs from the manual controller 16, a parameter changing means 248 for changing parameters including an effect level, a sound volume, etc. of audio data in response to control inputs from the manual controller 16, a selecting playback means 250 for selecting playback attributes according to control inputs, a sound re-sampling means 252 for re-sampling audio data of a portion of the reproduced audio data which is determined by a control input from the manual controller 16 and registering the re-sampled audio data in a predetermined playback slot, and a second command selecting means 254 for selecting various commands after audio data is re-sampled.

The second command selecting means 254 comprises the waveform editing means 222 (see FIG. 9) which removes excessive data from sampled audio data assigned to a selected playback slot, and re-sampled data registering means 256 for registering re-sampled audio data in the audio data file in the sound buffer 90.

The sound re-sampling means 252 uses a playback slot file 258 which has four records corresponding to respective four playback slots, for example, that are handled by the sound sampling means 252. Each of the four records of the playback slot file 258 stores audio data in a selected recording slot. Particularly, the fourth record corresponding to the fourth playback slot stores re-sampled audio data.

A processing sequence of the audio data processing means 200 will be described below with reference to FIGS. 9, 10, 11 through 23, and through 24 through 26.

Figure 11:
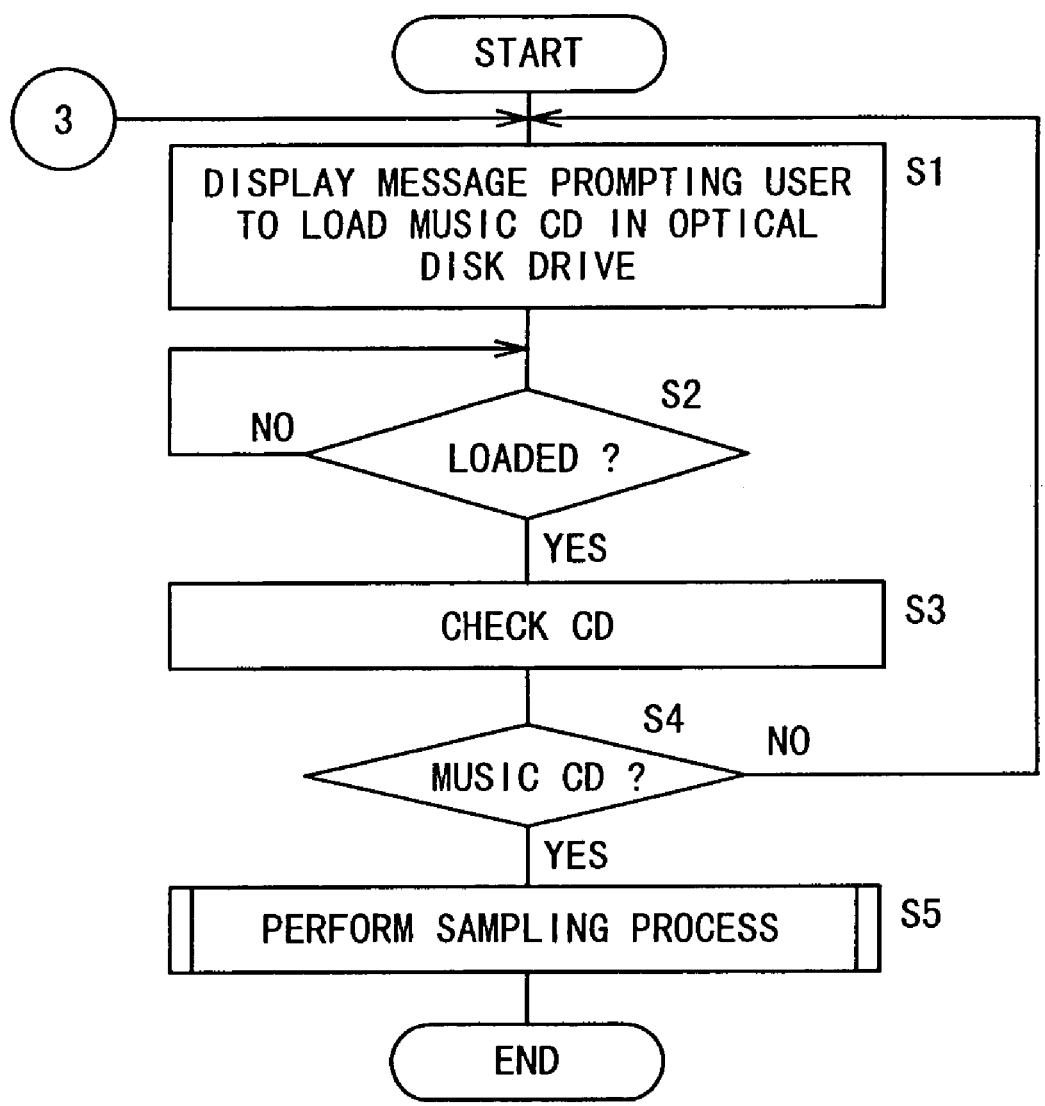
FIG. 11 is a flowchart of a processing sequence of the audio data processing means.

In step S1 shown in FIG. 11, the CD checking means 202 displays a message prompting the user to load a music CD in the optical disk drive 70 on the display monitor 18.

In step S2, the CD checking means 202 waits for an optical disk 20 to be loaded. If an optical disk 20 is loaded in the optical disk drive 70, then control goes to step S3 in which the CD checking means 202 checks the loaded optical disk 20.

In step S4, the CD checking means 202 checks if the loaded optical disk 20 is a music CD or not. If the loaded optical disk 20 is not a music CD, then control goes back to step S1, displaying a message prompting the user to load a music CD in the optical disk drive 70 on the display monitor 18. If the loaded optical disk 20 is a music CD, then control proceeds to step S5 in which the sampling means 204 performs its own processing sequence.

The processing sequence of the sampling means 204 will be described below with reference to FIGS. 12 and 13.

Figure 12:
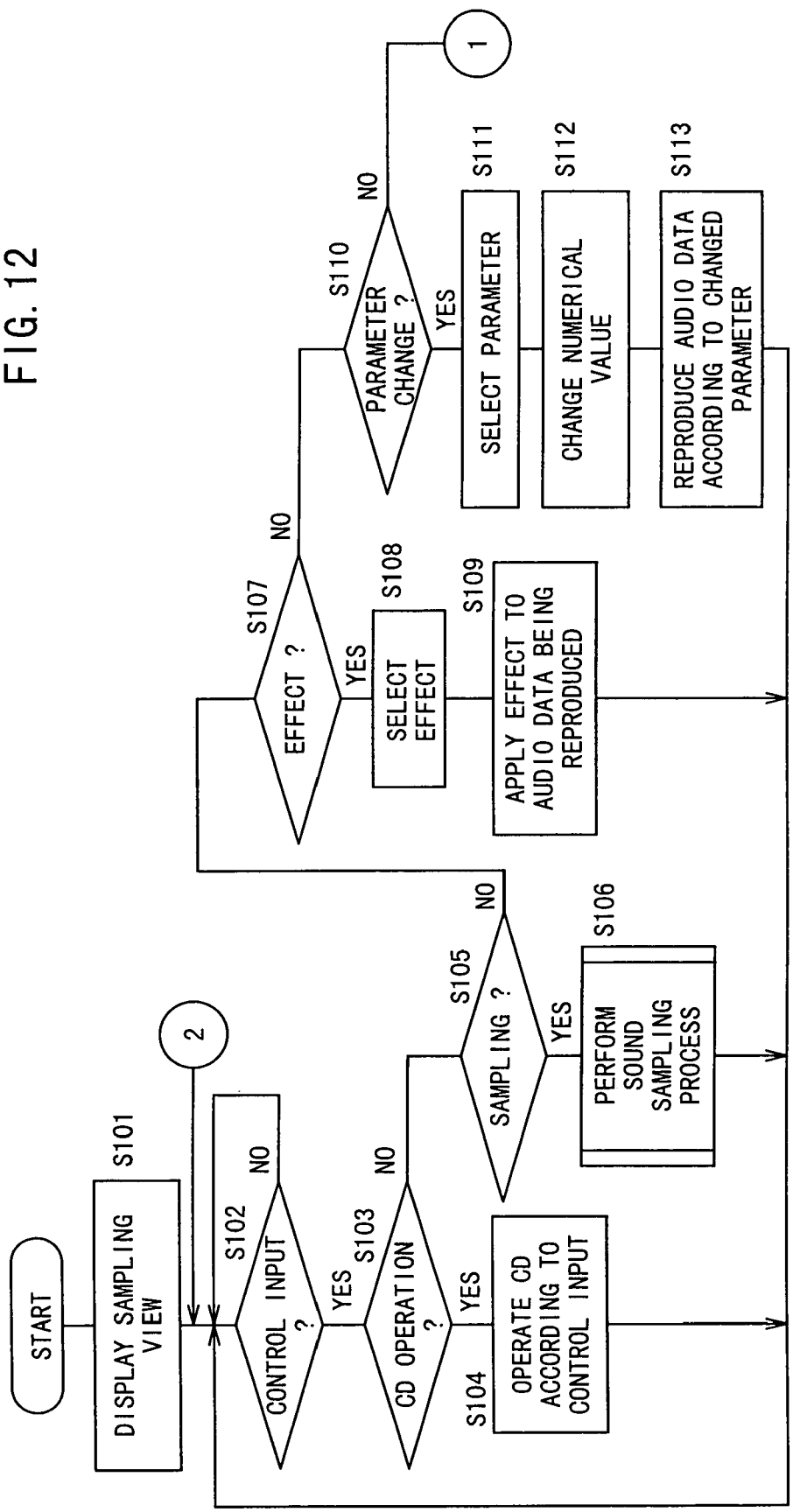
FIGS. 12 and 13 are a flowchart of a processing sequence of the sampling means.

In step S101 shown in FIG. 12, the sampling means 204 displays a sampling view 300 (see FIG. 24) on the display monitor 18. The sampling view 300 has a playback state display area 302 indicative of playback states, such as a playback track and a playback time, of the music CD, an operation display area 304 for applying an effect, changing parameters, and controlling the music CD, a waveform display area 306 for displaying a registration destination (recording slot) for sampled audio data and also displaying the waveform of sampled audio data, and a time display area 308 for displaying a bar representing a sampling time of audio data.

The operation display area 304 has an effect selecting area 310 for selecting various effects, a parameter changing area 312 for changing various parameters, and a CD control area 314 for controlling a CD.

The effects include a type (THRU) for playing back audio data without any effect applied, a type (ECHO) for applying an echo effect to audio data, a type (SPRING) for reverberating audio data using a spring, a type (FLANGER) for applying a flanger to audio data, etc. The user can select any on of the effects with the left button 110*d* and the right button 110*b*.

The parameters include an effect level (depth: EFX), a sound pitch (PIT), and a sound volume (VOL). The user can select any on of the parameters with the up button 110*a* and the down button 110*c*, and change the numerical value of a selected parameter with the left button 110*d* and the right button 110*b*.

The CD control area 314 displays icons for playing, stopping, accessing tracks (forward) of, and accessing tracks (backward) of, a CD. The user can select any one of these icons with the up button 110*a*, the down button 110*c*, the left button 110*d*, and the right button 110*b*.

In step S102 shown in FIG. 12, the sampling means 204 waits for a control input from the manual controller 16. If there is a control input from the manual controller 16, control goes to step S103 in which the sampling means 204 determines whether the control input is a control input relative to the control of the CD or not. If the control input is a control input relative to the control of the CD, then control goes to step S104 in which the CD controlling means 210 controls the CD according to the control input. Specifically, the CD controlling means 210 plays back the CD, stops the CD, accesses a track on the CD in a forward direction, or accesses a track on the CD in a backward direction.

If the control input is not a control input relative to the control of the CD, then control goes to step S105 in which the sampling means 204 determines whether the control input is a control input relative to sampling, e.g., a control input from the start button 40, or not. If the control input is a control input relative to sampling, then the sound sampling means 216 performs its own processing sequence.

The processing sequence of the sound sampling means 216 will be described below with reference to FIG. 14.

Figure 14:
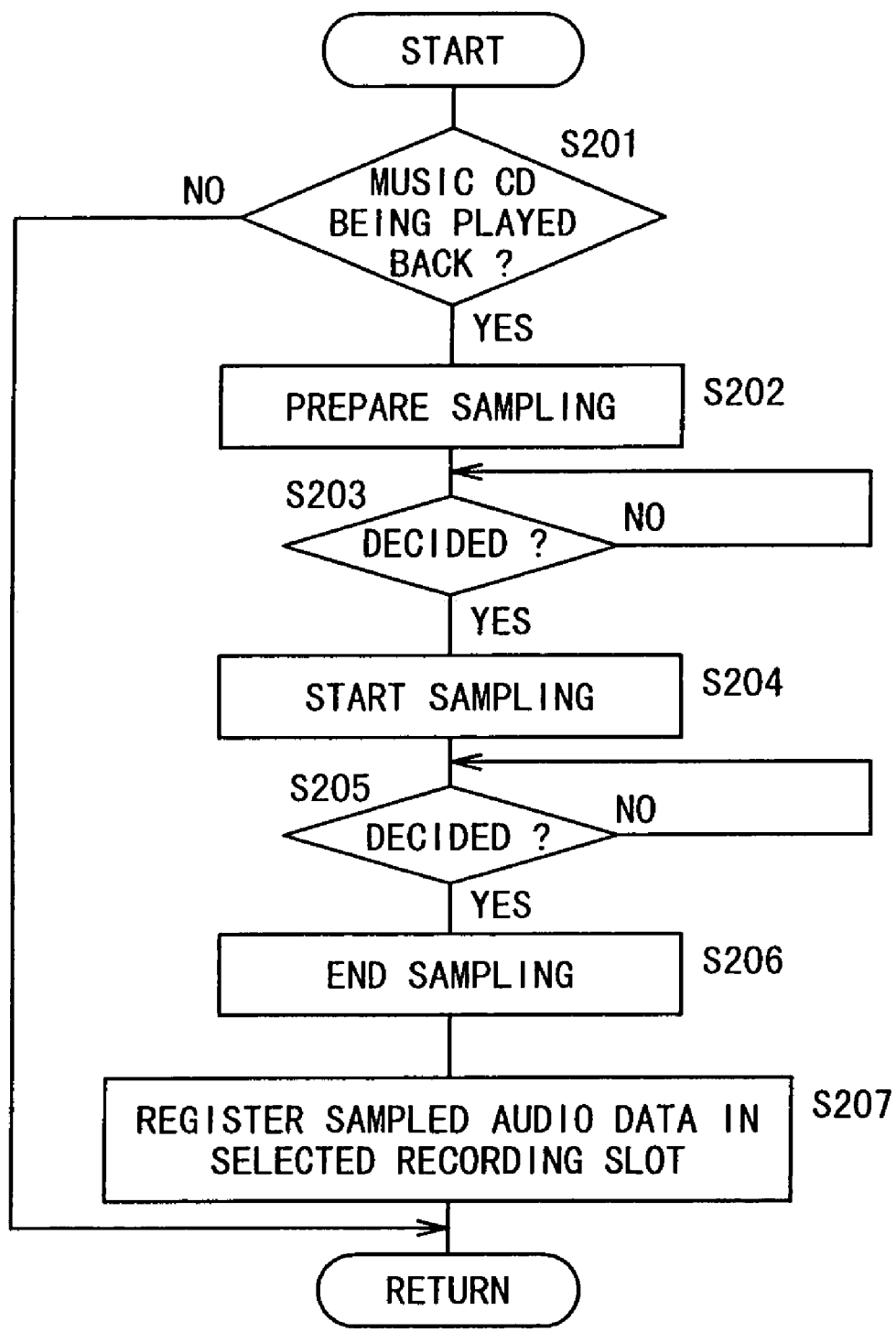
FIG. 14 is a flowchart of a processing sequence of a sound sampling means.

In step S201 shown in FIG. 14, the sound sampling means 216 determines whether a music CD is being played back or not. If a music CD is being played back, then control goes to step S202 in which a sampling process is prepared. At this time, the color of the displayed frame of the waveform display area 306 changes to yellow, for example, letting the user know that a sampling process is being prepared.

In step S203, the sound sampling means 216 waits for a control input from the button 112*d*, serving as a decision button, of the manual controller 16. If there is a control input from the decision button 112*d*, then control goes to step S204 in which the sound sampling means 216 starts sampling audio data that is being reproduced.

In step S205, the sound sampling means 216 waits for a control input from the decision button 112*d*. If there is a control input from the decision button 112*d*, then control goes to step S206 in which the sound sampling means 216 finishes the sampling process.

Thereafter, in step S207, the sound sampling means 216 registers sampled audio data in a record corresponding to a recording slot being selected, of the records in the recording slot file 228.

After step S207 or if a music CD is not being played back in step S201, the processing sequence of the sound sampling means 216 is finished.

Control then goes back to the routine shown in FIG. 12. If the control input is not a control input relative to sampling in step S105, then control goes to step S107 in which the sampling means 204 determines whether the control input is a control input relative to an effect or not. If the control input is a control input relative to an effect, then the effect applying means 212 performs its own processing sequence. Specifically, the user selects an effect with a control input in step S108, and the effect applying means 212 applies the selected effect to audio data being reproduced by the optical disk drive 70 in step S109.

If the control input is not a control input relative to an effect, then control goes to step S110 in which the sampling means 204 determines whether the control input is a control input relative to the changing of a parameter or not. If the control input is a control input relative to the changing of a parameter, then the parameter changing means 214 performs its own processing sequence. Specifically, the user selects a parameter with a control input in step S111, and then the parameter changing means 214 changes the numerical value of the selected parameter in step S112. Thereafter, in step S113, audio data is reproduced according to the changed parameter.

Figure 13:
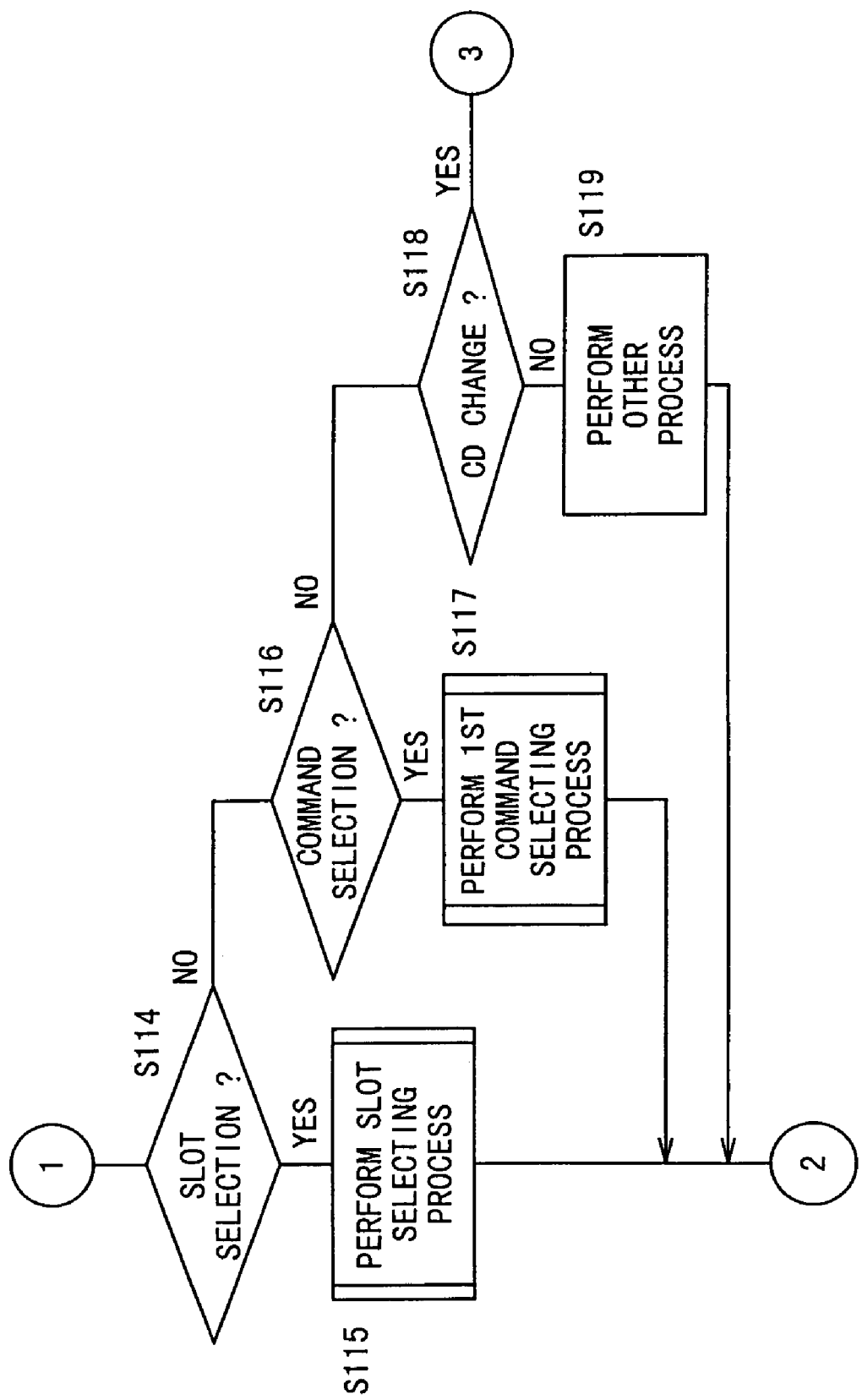

If the control input is not a control input relative to the changing of a parameter in step S110, then control goes to step S114 shown in FIG. 13 in which the sampling means 204 determines whether the control input is a control input relative to the selection of a slot, e.g., a control input from the R2 button 116b, or not.

If the control input is a control input relative to the selection of a slot, then control goes to step S115 in which the slot selecting means 218 performs its own processing sequence.

The processing sequence of the slot selecting means 218 will be described below with reference to FIG. 15.

Figure 15:
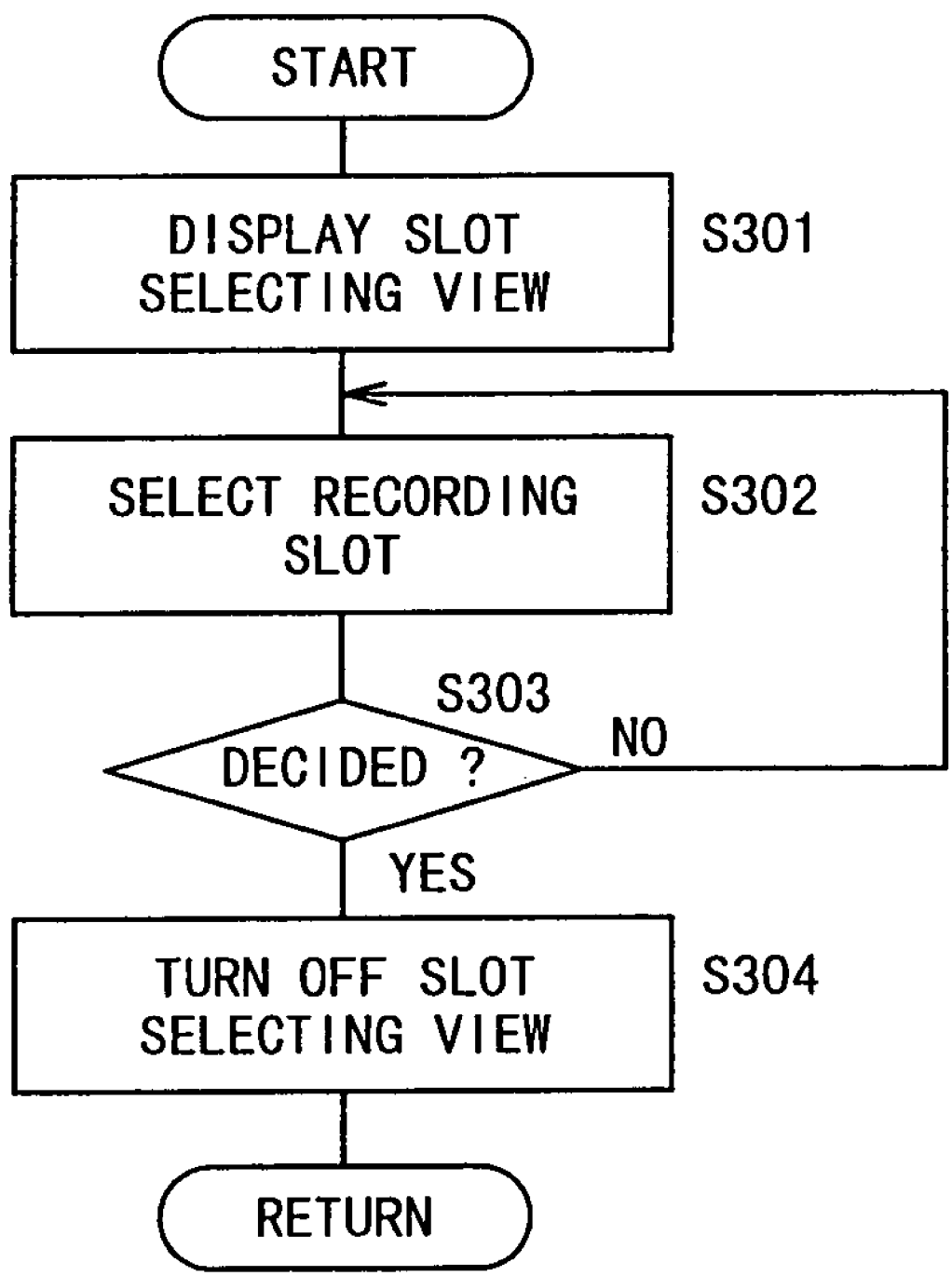
FIG. 15 is a flowchart of a processing sequence of a slot selecting means.

In step S301 shown FIG. 15, the slot selecting means 218 displays a slot selection view (window view), not shown, on the display monitor 18.

In step S302, the user selects a recording slot in which to register sampled audio data by pressing the up button 110a, the down button 110c, and the decision button 112d of the manual controller 16. Specifically, when the user presses the up button 110a and the down button 110c, a cursor is moved, and when the user presses the decision button 112d, a recording slot where the cursor is positioned is selected. Then, when the user presses the X button 112c, the selected recording slot is decided.

In step S303, the slot selecting means 218 determines whether the selected recording slot is decided or not. If the selected recording slot is not decided, control goes back to step S302 to select a recording slot again. If the selected recording slot is decided, then control goes to step S304 in which the slot selecting means 218 turns off the slot selection view. The processing sequence of the slot selecting means 218 now comes to an end.

Control then goes back to the routine shown in FIG. 13. In step S114, if the control input is not a control input relative to the selection of a slot, then control goes to step S116 in which the sampling means 204 determines whether the control input is a control input relative to the selection of a command, e.g., a control input from the selection button 42, or not.

If the control input is a control input relative to the selection of a command, then control goes to step S117 in which the first command selecting means 220 performs its own processing sequence.

The processing sequence of the first command selecting means 220 will be described below with reference to FIG. 16.

Figure 16:
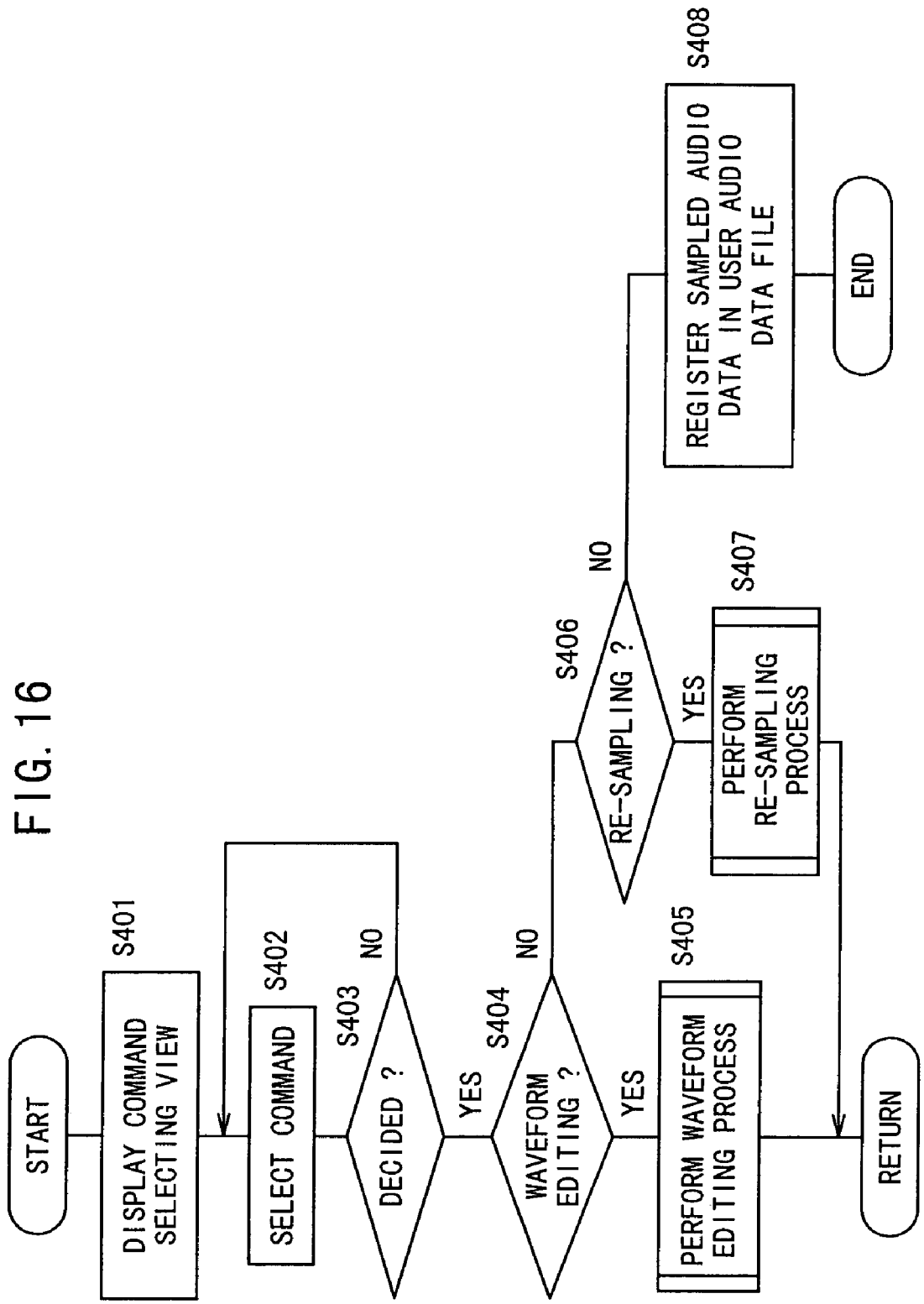
FIG. 16 is a flowchart of a processing sequence of a first command selecting means.

In step S401 shown in FIG. 16, the first command selecting means 220 displays a command request view, not shown, on the display monitor 18. The command request view comprises a window view with an array of three commands including a mode changing command (MODE CHANGE), a waveform editing command (WAVE EDIT), and an end command (EXIT).

In step S402, the user selects a command by pressing the left button 110d, the right button 110b, and the decision button 112d of the manual controller 16.

In step S403, the first command selecting means 220 determines whether the selected command is decided or not. If the selected command is not decided, control goes back to step S402 to select a command again. If the selected command is decided, then control goes to step S404 in which the first command selecting means 220 determines whether the selected command is a command for editing a waveform. If the selected command is a command for editing a waveform, then control goes to step S405 in which the waveform editing means 222 performs its own processing sequence.

The processing sequence of the waveform editing means 222 will be described below with reference to FIG. 17.

Figure 17:
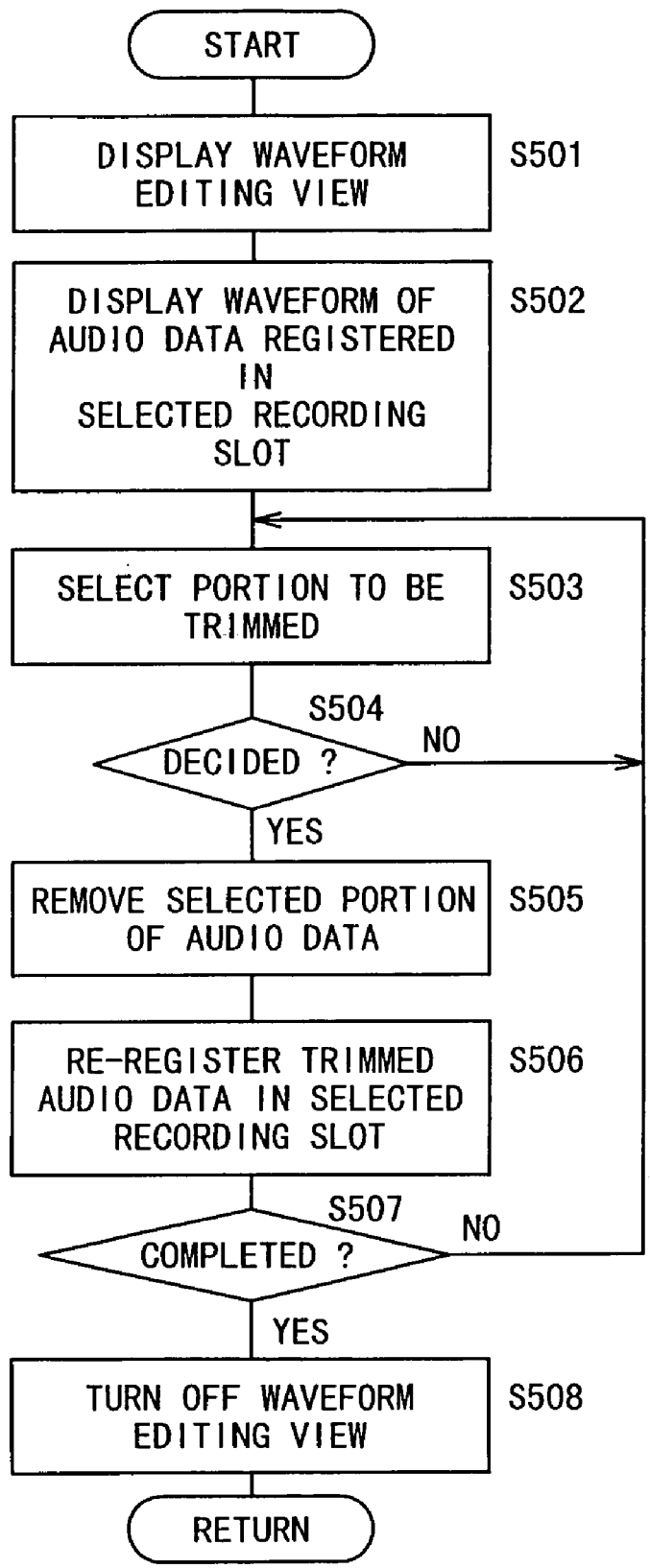
FIG. 17 is a flowchart of a processing sequence of a waveform editing means.
Figure 25:
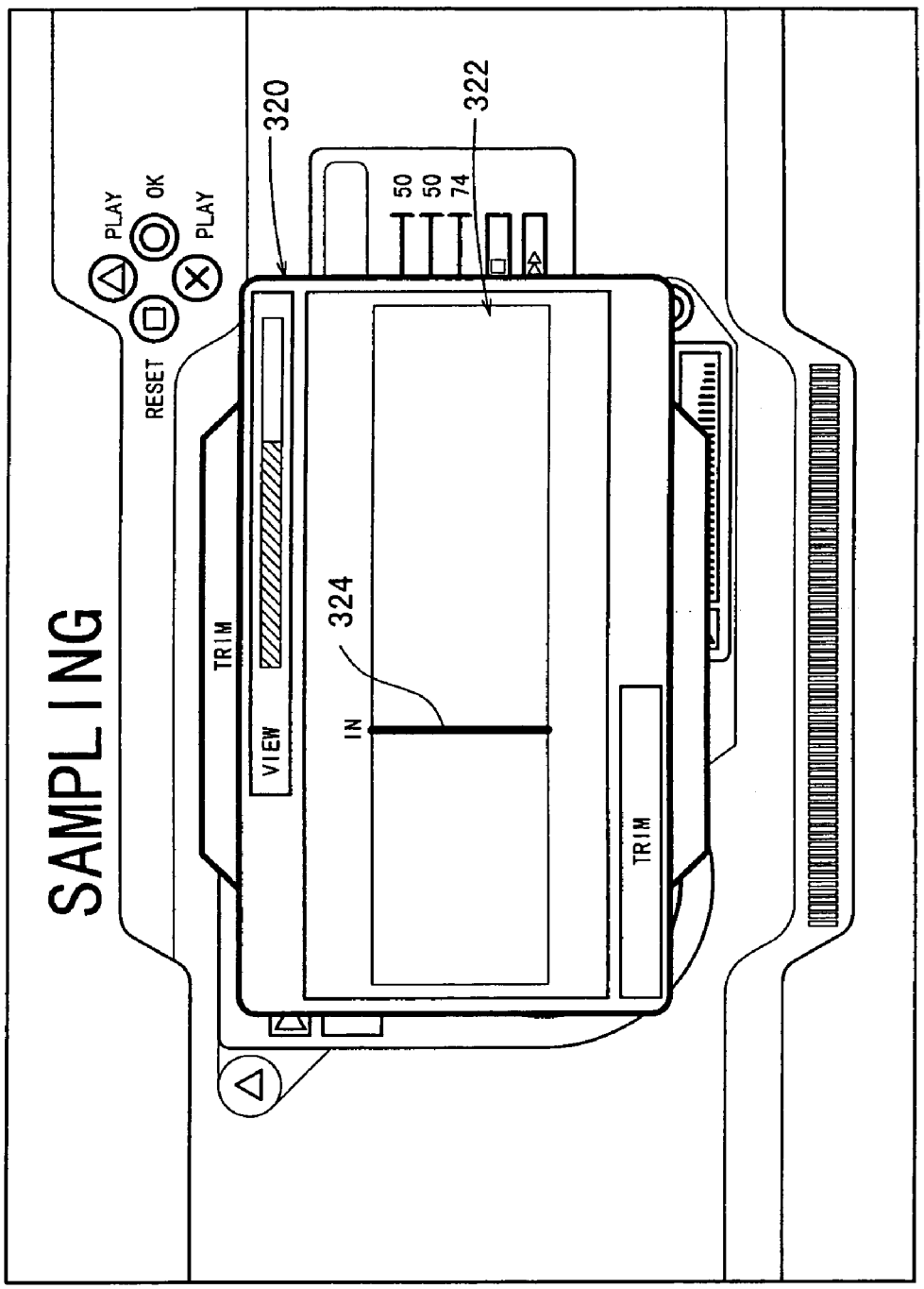
FIG. 25 is a view showing a displayed waveform editing view.
Figure 26:
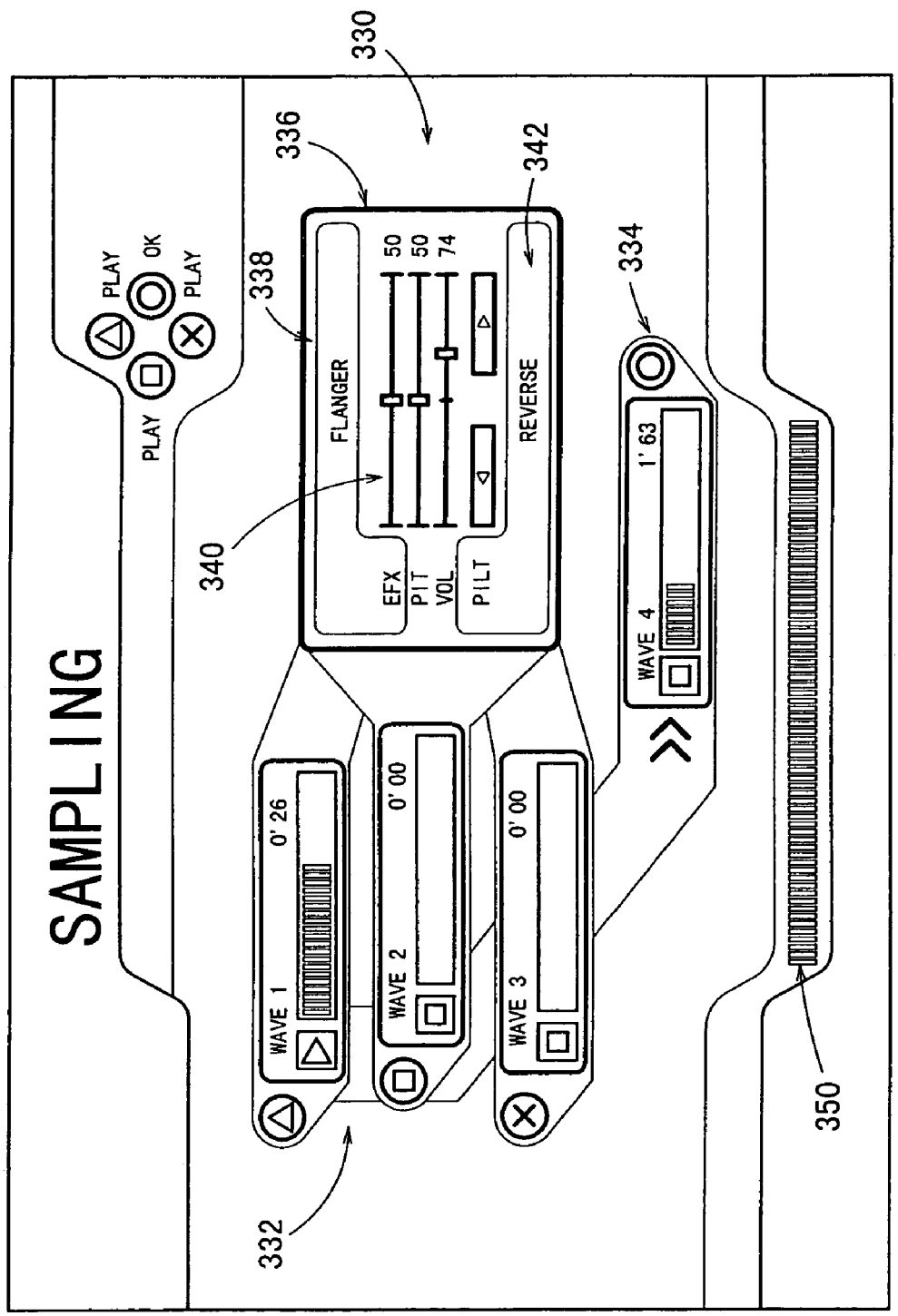
FIG. 26 is a view showing a displayed re-sampling view.

In step S501 shown in FIG. 17, the waveform editing means 222 displays a waveform editing view 320 (see FIG. 25) on the display monitor 18. As shown in FIG. 25, the waveform editing view 320 is a window view having a waveform display area 322 for displaying the waveform of sampled audio data.

In the waveform editing view 320, the user can trim front and rear portions on a time axis of the displayed waveform. Specifically, the user presses the down button 110c to place a cursor 324 in the front or rear portion of the displayed waveform, and then presses the left button 110d or the right button 110b to decides a region (time width) to be trimmed off the displayed waveform. After having decided the region to be trimmed off the displayed waveform, the user presses the decision button 112d to trim the region off the displayed waveform.

In step S502 shown in FIG. 17, the waveform editing means 222 displays the waveform of an audio data registered in a selected recording slot in the waveform display area 322.

In step S503, the user decides a region to be trimmed off the displayed waveform in the manner described above. Thereafter, the waveform editing means 222 determines whether the region to be trimmed has been decided or not in step S504. If not decided, then control goes back to step S503 for the user to decide a region to be trimmed off the displayed waveform again.

If decided, then control goes to step S505 in which the waveform editing means 222 removes, i.e., trims the selected region off the displayed waveform.

In step S506, the waveform editing means 222 reregisters the trimmed audio data in the selected recording slot. That it, the waveform editing means 222 re-registers the trimmed audio data in a record corresponding to the selected recording slot, of the records in the recording slot file.

In step S507, the waveform editing means 222 determines whether the trimming process has been completed or not based on whether there is a control input from the X button 112c, for example, or not.

If the trimming process has not been completed, then control goes back to step S503 to select a region to be trimmed again. If the trimming process has been completed, then control goes to step S508 in which the waveform editing means 222 turns off the waveform editing view 320. The processing sequence of the waveform editing means 222 is finished.

Control then returns to the routine shown in FIG. 16. If the selected command is a not command for editing a waveform in step S404 shown in FIG. 16, then control goes to step S406 in which the first command selecting means 220 determines whether the selected command is a command for resampling or not. If the selected command is a command for re-sampling, then control goes to step S407 in which the resampling means 224 performs its own processing sequence. The processing sequence of the re-sampling means 224 will be described later on.

If the selected command is not a command for resampling in step S406, then control goes to step S408 in which the sampled data registering means 226 registers the sampled audio data which has been registered in the selected recording slot, in the audio data file, e.g., a user audio data file, in the sound buffer 90. At this time, the audio data becomes available for use as one sound source for the entertainment apparatus 12. After step S408, the processing sequence of the sampling means 204 is ended.

Control then returns to the routine shown in FIG. 13. If the control input is not a control input relative to the selection of a command in step S116, then control goes to step S118 in which the sampling means 204 determines whether the control input is a control input relative to the changing of a CD or not based on whether the control input is a control input from the R1 button 116a or not.

If the control input is a control input relative to the changing of a CD, then control goes back to step S1 shown in FIG. 11 to display a message prompting the user to change a CD in the optical disk drive 70 on the display monitor 18 and wait for a CD to be changed. The user can leave this waiting state by pressing the X button 112c.

If the control input is not a control input relative to the changing of a CD in step S118 shown in FIG. 13, then control goes to step S119 in which another process depending on the control input is carried out.

The processing sequence of the re-sampling means 224 will be described below with reference to FIGS. 18 and 19.

Figure 18:
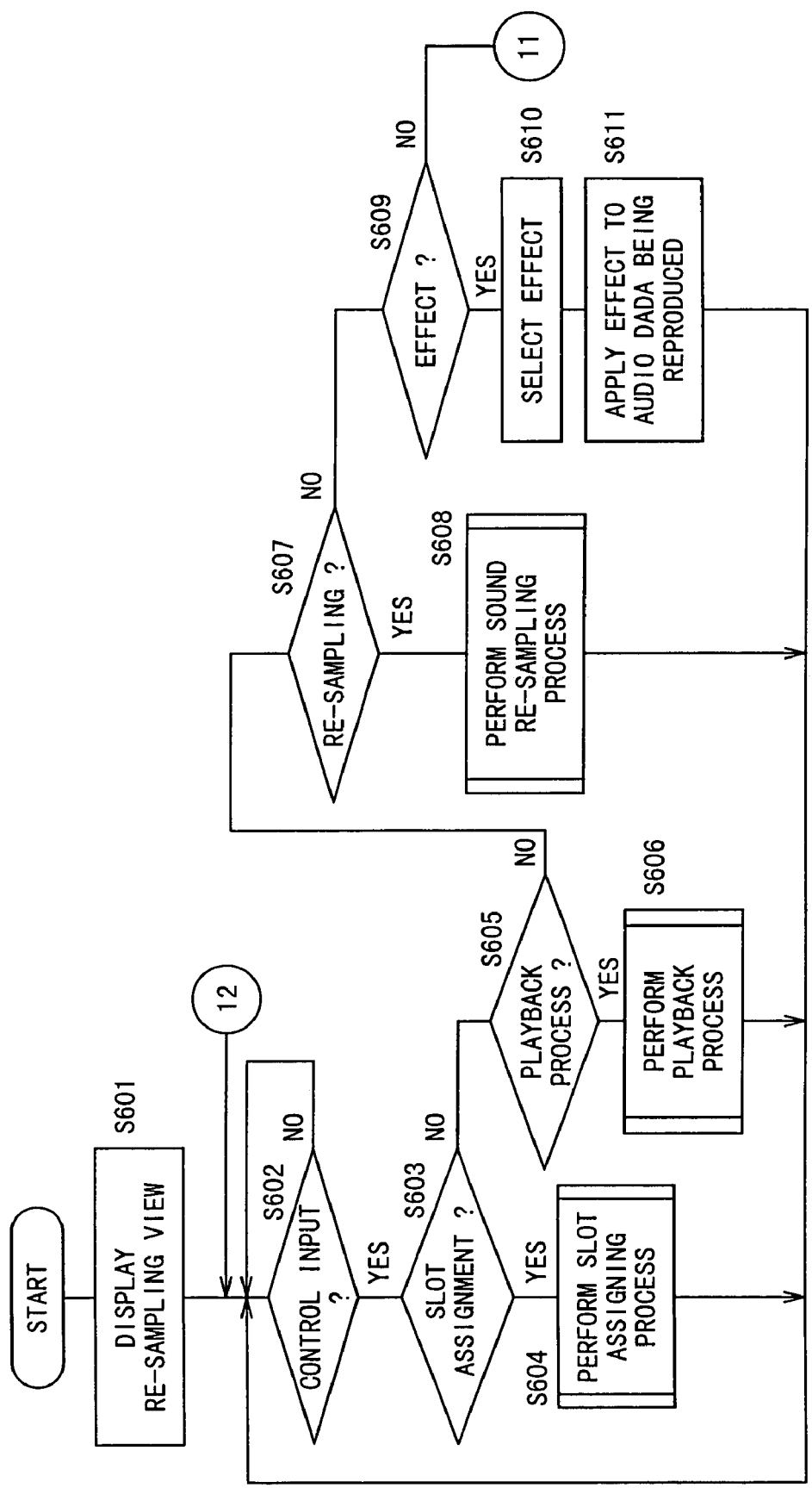
FIGS. 18 and 19 are a flowchart of a processing sequence of the re-sampling means.

In step S601 shown in FIG. 18, the re-sampling means 224 displays a re-sampling view 330 (see FIG. 26) on the display monitor 18. The re-sampling view 330 has a first slot display area 332 for displaying three selected recording slots, a second slot display area 334 for displaying the recording slot of re-sampled audio data, a playback attribute display area 336 for applying an effect, changing parameters, and selecting playback attributes, and a time display area 350 for displaying a bar representing a resampling time of audio data.

The playback attribute display area 336 has an effect selecting area 338 for selecting various effects, a parameter changing area 340 for changing various parameters, and a playback attribute selecting area 342 for selecting playback attributes.

Figure 24:
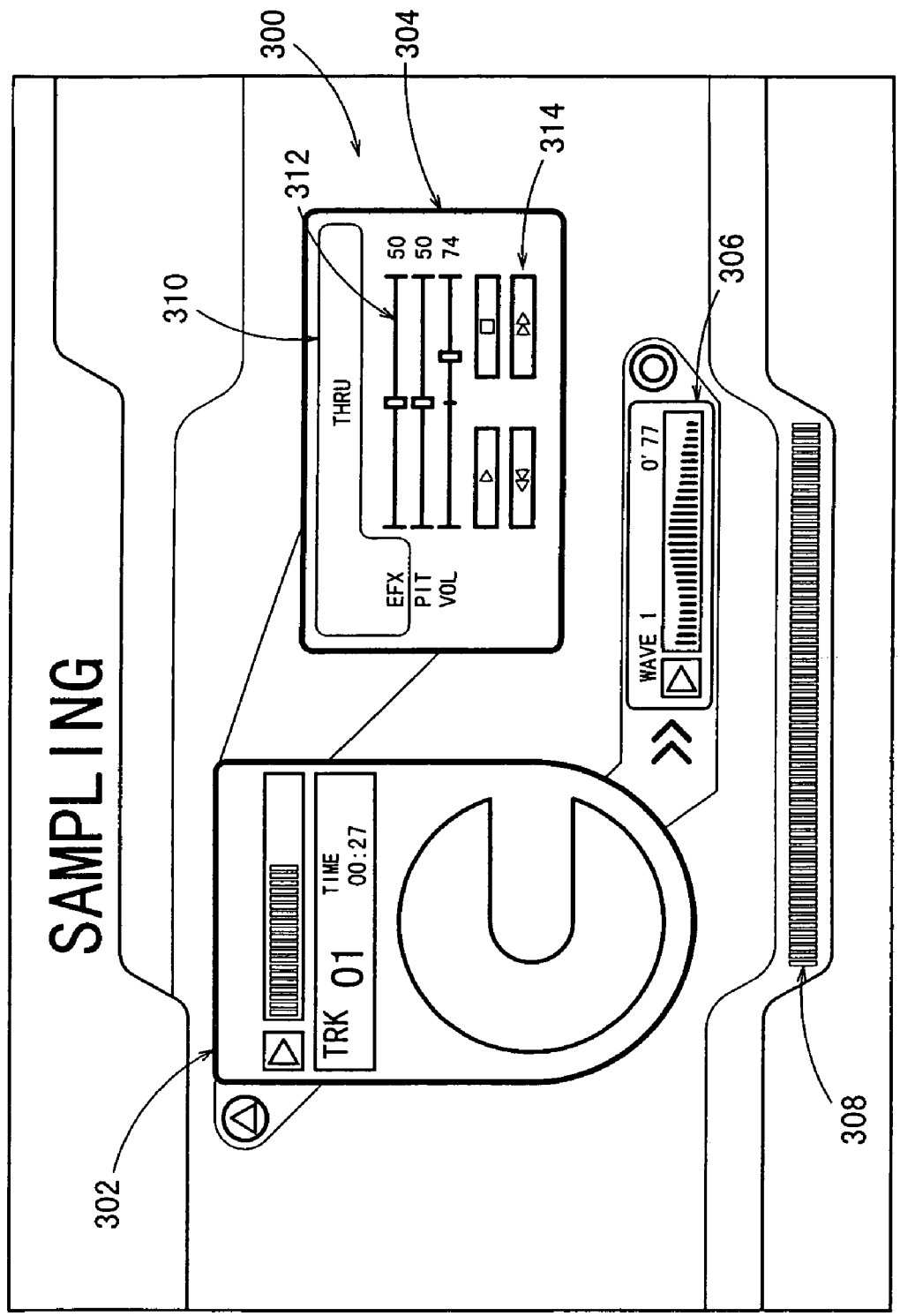
FIG. 24 is a view showing a displayed sampling view.

The effect selecting area 338 and the parameter changing area 340 are the same as the effect selecting area 310 and the parameter changing area 312 in the sampling view 300 shown in FIG. 24, and will not be described below. The playback attribute selecting area 342 allows the user to select a playback direction and playback attributes. The user can select playback attributes by pressing the left button 110d and the right button 110b. The playback attributes that can be selected include a reverse playback mode (REVERSE), a skipping playback mode (SKIP), and a scratch playback mode (SCRATCH).

In step S602 shown in FIG. 18, the re-sampling means 224 waits for a control input from the manual controller 16. If there is a control input from the manual controller 16, control goes to step S603 in which the re-sampling means 224 determines whether the control input is a control input relative to the assignment of a slot, e.g., a control input from the R2 button 116b, or not. If the control input is a control input relative to the assignment of a slot, then control goes to step S604 in which the slot assigning means 240 performs its own processing sequence.

The processing sequence of the slot assigning means 240 will be described below with reference to FIG. 20.

Figure 20:
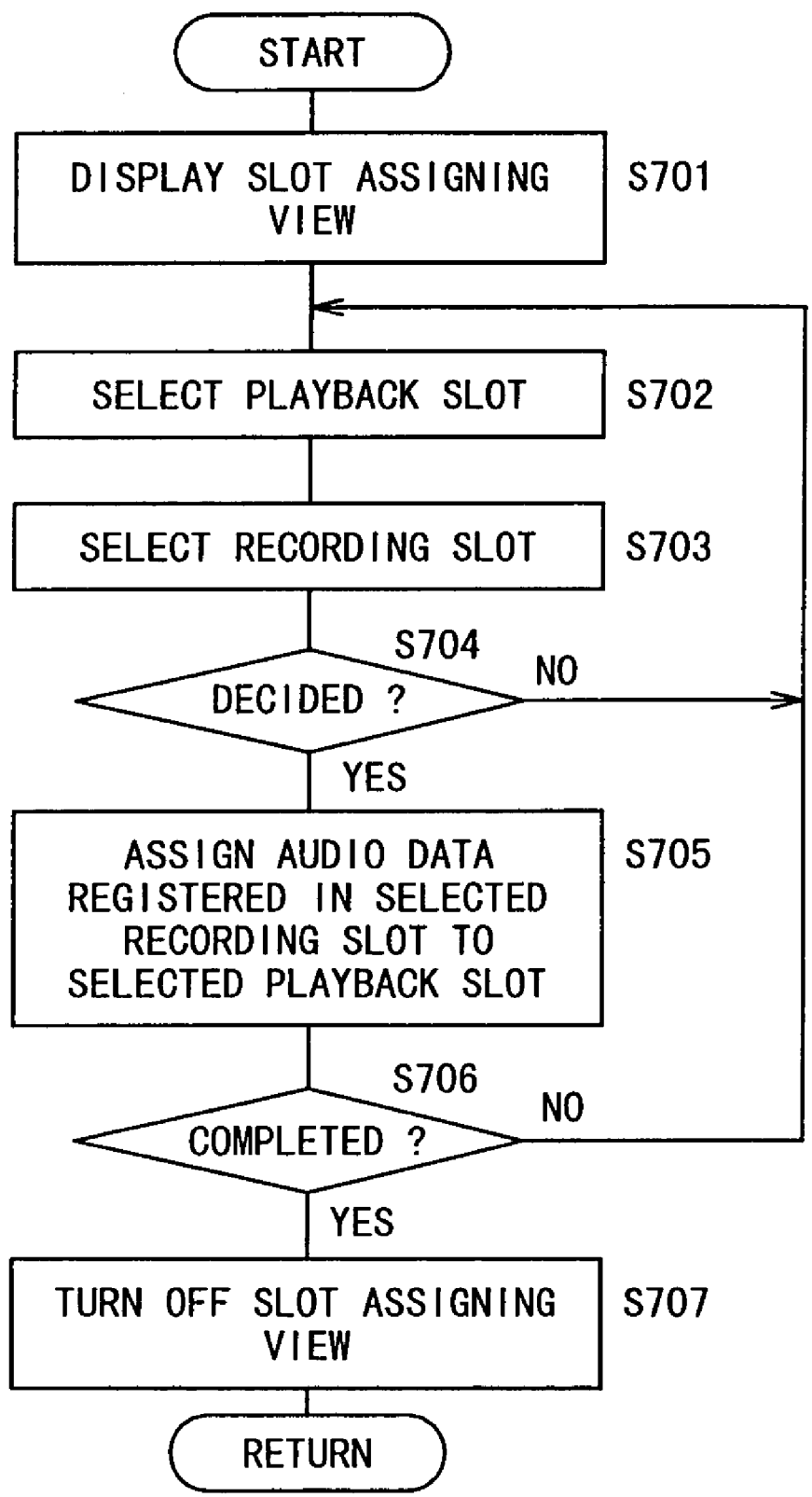
FIG. 20 is a flowchart of a processing sequence of a slot assigning means.

In step S701 shown in FIG. 20, the slot assigning means 240 displays a slot assigning view, not shown, which comprises a window view having a playback slot display area for displaying four playback slots and a recording slot display area for displaying six recording slots.

In step S702, the user selects a playback slot by pressing the L1 button 114a and the L2 button 114b. Then, in step S703, the user selects a recording slot by pressing the up button 110a and the down button 110c.

In step S704, the slot assigning means 240 determines whether the selected slots have been decided or not based on whether there is a control input from the decision button 112d or not. If the selected slots have not been decided, then control goes back to step S702 for the user to select a playback slot and a recording slot again.

If the selected slots have been decided, then control goes to step S705 in which the slot assigning means 240 assigns the audio data registered in the selected recording slot to the selected playback slot. For example, the audio data registered in the second recording slot is assigned to the first playback slot, the audio data registered in the third recording slot is assigned to the second playback slot, the audio data registered in the fourth recording slot is assigned to the third playback slot, and the audio data registered in the sixth recording slot is assigned to the fourth playback slot.

In step 706, the slot assigning means 240 determines whether the assignment of a slot has been completed or not based on whether there is a control input from the X button 112c or not. If the assignment of a slot has not been completed, then control goes back to step S702 to assign a slot again. If the assignment of a slot has been completed, then control goes to step S707 in which the slot assigning means 240 turns off the slot assigning view. The processing sequence of the slot assigning means 240 now comes to an end.

Control then returns to the routine shown in FIG. 18. If the control input is not a control input relative to the assignment of a slot in step S603, then the re-sampling means 224 determines whether the control input is a control input relative to a playback process, i.e., a control input from the A button 112a, the □ button 112b, the X button 112c, or the decision button 112d, or not in step S605.

If the control input is a control input relative to a playback process, then control goes to step S606 in which the playback processing means 242 performs its own processing sequence.

The processing sequence of the playback processing means 242 will be described below with reference to FIG. 21.

Figure 21:
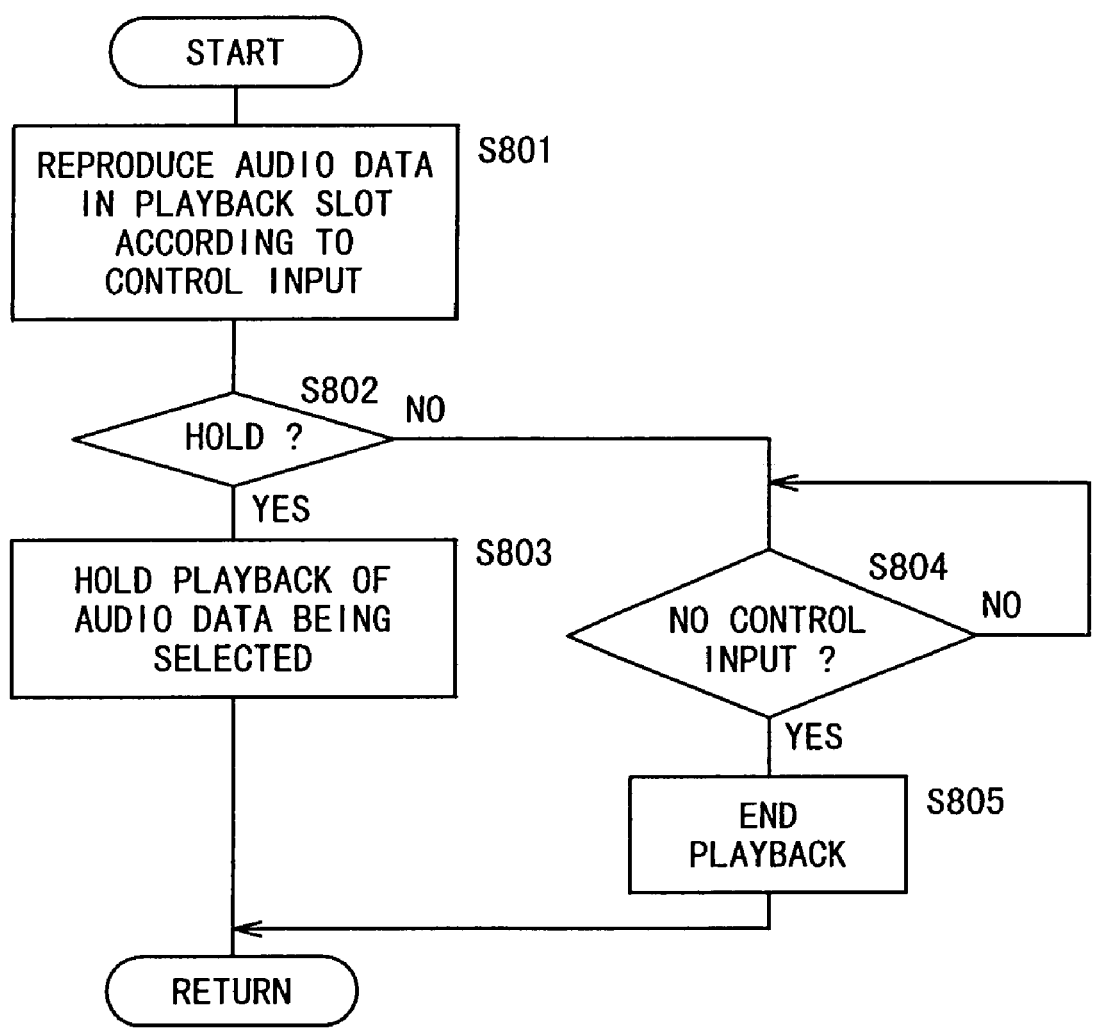
FIG. 21 is a flowchart of a processing sequence of a playback processing means.

In step S801 shown in FIG. 21, the playback processing means 242 reproduces audio data in a playback slot depending on the control input. Specifically, if the control input comes from the Δ button 112a, then the playback processing means 242 reproduces audio data in the first playback slot. If the control input comes from the □ button 112b, then the playback processing means 242 reproduces audio data in the second playback slot. If the control input comes from the X button 112c, then the playback processing means 242 reproduces audio data in the third playback slot. If the control input comes from the decision button 112d, then the playback processing means 242 reproduces audio data in the fourth playback slot.

In step S802, the playback processing means 242 determines whether there is a control input indicative of a playback hold mode, e.g., a control input from the R1 button 116a, or not. If there is a control input indicative of a playback hold mode, then control goes to step S803 in which the playback processing means 242 holds the playback of the audio data assigned to the selected playback slot.

If there is not a control input indicative of a playback hold mode in step S802, then control goes to step S804 in which the playback processing means 242 waits for a control input to end. If a control input comes to an end, then control goes to step S805 to finish the playback process.

After step S803 or step S805, the processing sequence of the playback processing means 242 is brought to an end.

Then, control returns to the routine shown in FIG. 18. If the control input is no a control input relative to a playback process in step S605, then control goes to step S607 in which the re-sampling means 224 determines whether the control input is a control input relative to re-sampling or not. If the control input is a control input relative to re-sampling, then control goes to step S608 in which the sound re-sampling means 252 performs its own processing sequence. The processing sequence of the sound re-sampling means 252 will be described later on.

If the control input is not a control input relative to re-sampling in step S607, then control goes to step S609 in which the re-sampling means 224 determines whether the control input is a control input relative to an effect or not. If the control input is a control input relative to an effect, then the effect applying means 246 performs its own processing sequence. Specifically, the user selects an effect with a control input in step S610, and the effect applying means 246 applies the selected effect to audio data being reproduced by the optical disk drive 70 in step S611.

In the step S609, if the control input is not a control input relative to an effect, then control goes to step S612 (see FIG. 19) in which the re-sampling means 224 determines whether the control input is a control input relative to the changing of a parameter or not. If the control input is a control input relative to the changing of a parameter, then the parameter changing means 248 performs its own processing sequence. Specifically, the user selects a parameter with a control-input in step S613, and then the parameter changing means 248 changes the numerical value of the selected parameter in step S614. Thereafter, in step S615, audio data is reproduced according to the changed parameter.

If the control input is not a control input relative to the changing of a parameter in step S612, then control goes to step S616 in which the re-sampling means 224 determines whether the control input is a control input relative to the selection of a playback attribute or not. If the control input is a control input relative to the selection of a playback attribute, then the selecting playback means 250 performs its own processing sequence. Specifically, the user selects a playback attribute with a control input in step S617, and the selecting playback means 250 reproduces audio data according to the selected playback attribute in step S618.

If the control input is not a control input relative to the selection of a playback attribute in step S616, then control goes to step S619 in which the re-sampling means 224 determines whether the control input is a control input relative to the selection of a slot. A slot can be selected with the L1 button 114a and the L2 button 114b, for example.

If the control input is a control input relative to the selection of a slot, then control goes to step S620 in which the slot selecting means 244 selects a playback slot to be played back according to a control input.

The processing sequence of the sound re-sampling means 252 in step S608 will be described below with reference to FIG. 22.

Figure 22:
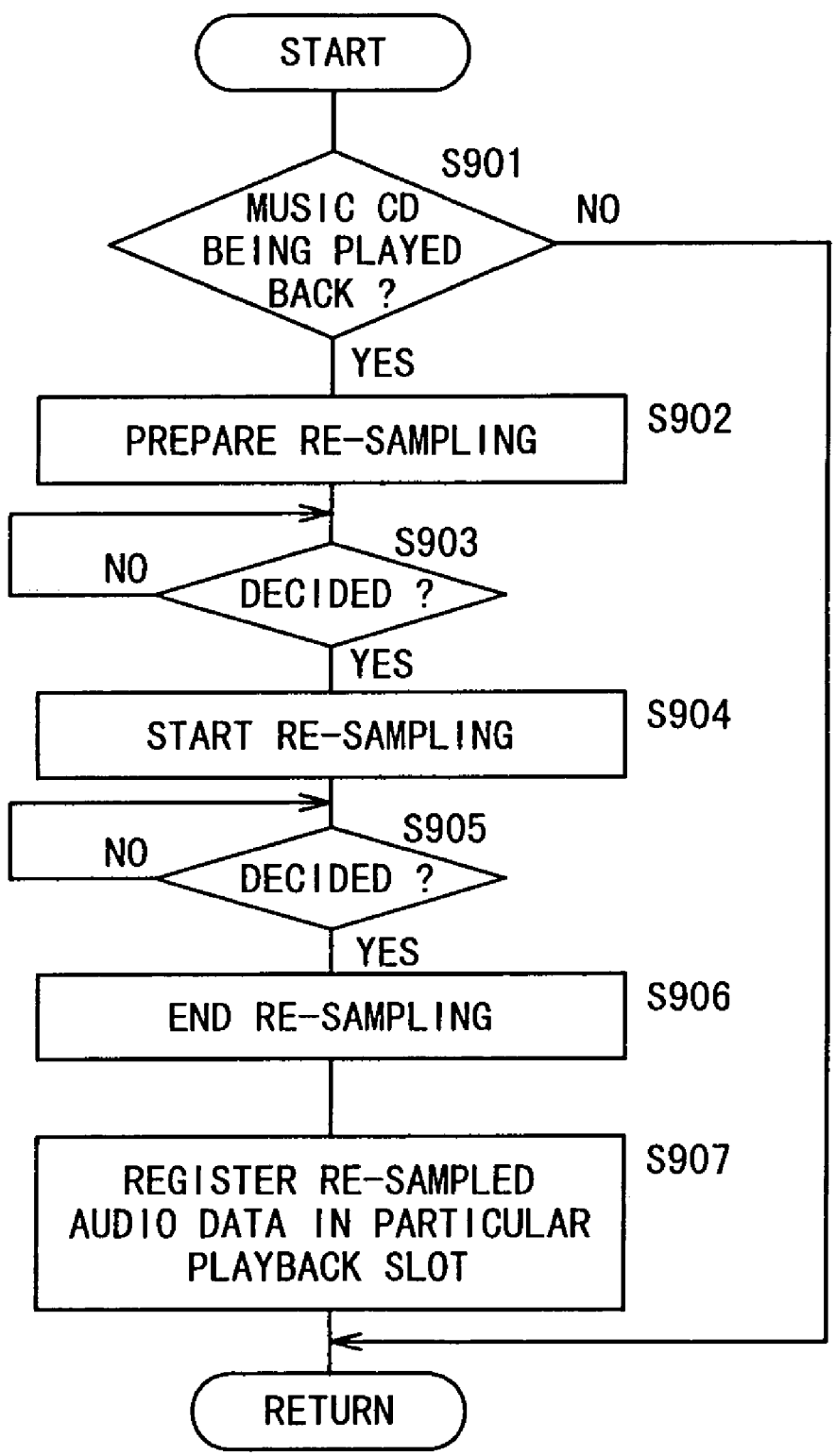
FIG. 22 is a flowchart of a processing sequence of a sound re-sampling means.

In step S901 shown in FIG. 22, the sound re-sampling means 252 determines whether audio data is being reproduced or not. If audio data is being reproduced, then control goes to step S902 in which a re-sampling process is prepared.

At this time, the color of the displayed frame of the second slot display area 334 changes to yellow, for example, letting the user know that a re-sampling process is being prepared.

In step S903, the sound re-sampling means 252 waits for a control input from the decision button 112d. If there is a control input from the decision button 112d, then control goes to step S904 in which the sound re-sampling means 252 starts re-sampling audio data that is being reproduced.

In step S905, the sound re-sampling means 252 waits for a control input from the decision button 112d. If there is a control input from the decision button 112d, then control goes to step S906 in which the sound re-sampling means 252 finishes the re-sampling process.

Thereafter, in step S907, the sound re-sampling means 252 registers re-sampled audio data in the fourth playback slot, i.e., in a record corresponding to the fourth playback slot, of the records in the playback slot file 258.

After step S907 or if audio data is not being reproduced in step S901, the processing sequence of the sound resampling means 252 is finished.

Figure 19:
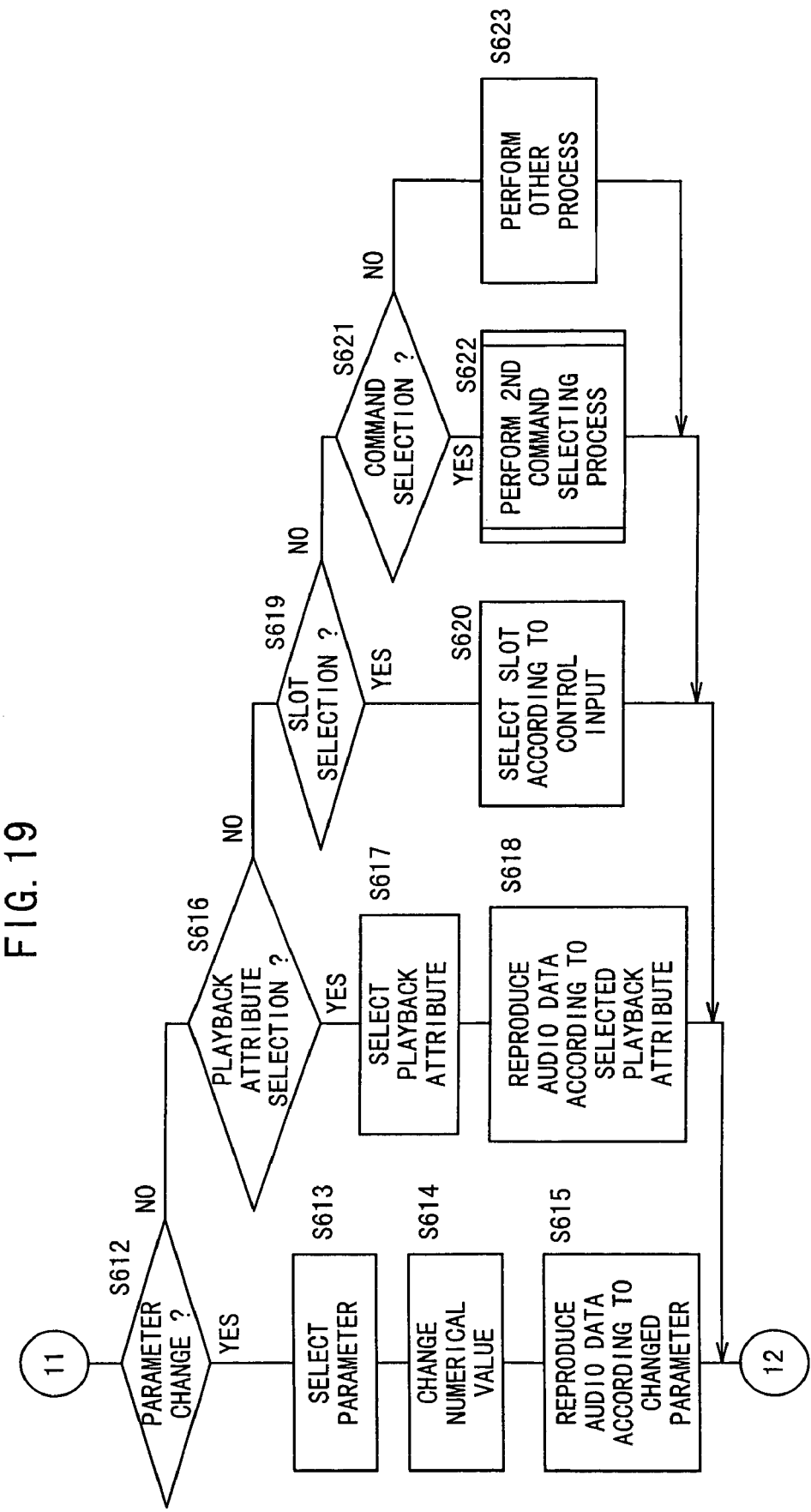

Control then goes back to the routine shown in FIG. 19. If the control input is not a control input relative to the selection of a slot in step S619, then control goes to step S621 in which the sound re-sampling means 252 determines whether the control input is a control input relative to the selection of a command, e.g., a control input from the selection button 42, or not.

If the control input is a control input relative to the selection of a command, then control goes to step S622 in which the second command selecting means 254 performs its own processing sequence.

The processing sequence of the second command selecting means 254 will be described below with reference to FIG. 23.

Figure 23:
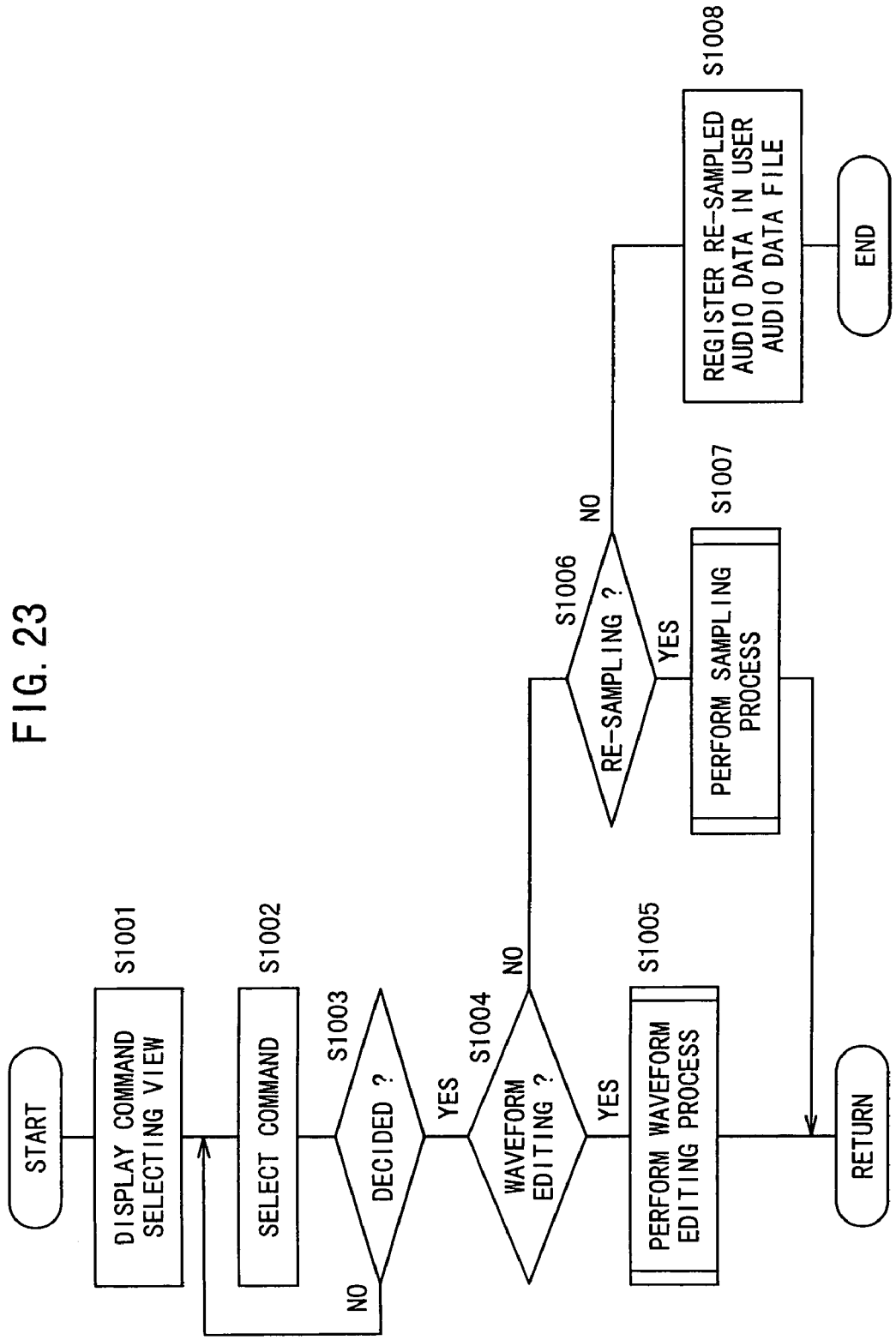
FIG. 23 is a flowchart of a processing sequence of a second command selecting means.

In step S1001 shown in FIG. 23, the second command selecting means 254 displays a command request view, not shown, on the display monitor 18. The command request view comprises a window view with an array of three commands including a mode changing command (MODE_CHANGE), a waveform editing command (WAVE_EDIT), and an end command (EXIT).

In step S1002, the user selects a command by pressing the left button 110d, the right button 110b, and the decision button 112d of the manual controller 16.

In step S1003, the second command selecting means 254 determines whether the selected command is decided or not. If the selected command is not decided, control goes back to step S1002 to select a command again. If the selected command is decided, then control goes to step S1004 in which the second command selecting-means 254 determines whether the selected command is a command for editing a waveform. If the selected command is a command for editing a waveform, then control goes to step S1005 in which the waveform editing means 222 performs its own processing sequence.

The processing sequence of the waveform editing means 222 is essentially the same as the processing sequence shown in FIG. 17, and will not be described in detail below. In this processing sequence, the waveform editing means 222 edits the waveform, i.e., trims, the audio data assigned to the selected playback slot.

If the selected command is a not command for editing a waveform in step S1004, then control goes to step S1006 in which the second command selecting means 252 determines whether the selected command is a command for sampling or not. If the selected command is a command for sampling, then control goes to step S1007 in which the sampling means 204 performs its own processing sequence. The processing sequence of the sampling means 204 has been described, and hence will not be described below.

If the selected command is not a command for sampling in step S1006, then control goes to step S1008 in which the re-sampled data registering means 256 registers the resampled audio data which has been registered in the fourth playback slot, in the audio data file, e.g., a user audio data file, in the sound buffer 90. At this time, the audio data becomes available for use as one sound source for the entertainment apparatus 12. After step S1008, the processing sequence of the re-sampling means 224 is ended.

Control then returns to the routine shown in FIG. 19. If the control input is not a control input relative to the selection of a command in step S621, then control goes to step S623 in which another process depending on the control input is carried out.

In the entertainment system 10, extracted audio data of audio data introduced from an external source is registered as one of sound sources for the entertainment apparatus 12. Therefore, audio data supplied from music compact discs (CDs) or via a network can be used as a sound source for video games to be played back on the entertainment apparatus 12, providing an additional element of interest for video games.

Particularly, the waveform editing means 222 for removing excessive data from the extracted audio data can cut off unwanted data from the extracted audio data, leaving only impressive audio data for use as a sound source.

Furthermore, since the effect applying means 212, 246 for applying desired effects to the extracted audio data are provided, even one form of audio data can be modified into different forms of audio data by applying various effects, resulting in a variety of sound sources available.

The re-sampling means 224 is provided for re-extracting desired audio data from the extracted audio data. Consequently, the user can extract only favorite portions from the audio data to which various effects have been applied or the audio data from which unwanted portions have been removed. Therefore, the quality of audio data for use as sound sources can be increased, and the process of extracting audio data is easy.

Moreover, the selecting playback means 250 is provided for reproducing the extracted audio data according to one of a plurality of playback attributes which is selected by a control input from the manual controller 16. Therefore, the audio data can be varied in various playback modes such as the reverse playback mode and the skipping playback mode, resulting in a variety of sound sources available.

In the illustrated embodiment, audio data is introduced from a music CD loaded in the optical disk drive 70 of the entertainment apparatus 12. However, audio data may be introduced from a music playback device such as another optical disk drive, a DAT (Digital Audio Tape recorder), or the like connected to an external interface, e.g., a parallel I/O interface, of the entertainment apparatus 12, with the music playback device being controlled by the CPU 72.

The audio data processing means can be executed without having to replace an optical disk which stores the audio data processing means and various data, with a music CD, so that the entertainment system can be operated with ease and the optical disk can be replaced with various music CDs quickly.

Although a certain preferred embodiment of the present invention has been shown-and-described in detail, it should be understood that various changes and modifications may be made therein without departing from the scope of the appended claims.

The invention claimed is:

1. An entertainment system comprising:
   an entertainment apparatus for executing various programs;
   at least one manual controller for entering control requests from the user into said entertainment apparatus;
   audio output means for selecting and outputting one of a plurality of sound sources based on a supplied sound output command;
   sampling means for selectively sampling audio data from audio output data during reproducing and registering said sampled audio data in a first file, wherein said sampling means comprises first effect applying means for applying an effect to said audio data being input from outside based on a request from said user;
   re-sampling means to be selectively activated based on a request from said user for selectively re-sampling audio data from audio data registered in said first file when reproducing said audio data registered in said first file, the re-sampling means registering said re-sampled audio data in a second file, wherein said re-sampling means comprises second effect applying means for applying an effect to said audio data registered in said first file when reproducing said audio data registered in said first file;
   audio data registering means for registering said audio data registered in said first file or said audio data registered in said second file based on a request from said user as one of said sound sources for said entertainment apparatus.

2. An entertainment system according to claim 1, further comprising,
   wave editing means for trimming said audio data registered in said first file and/or said second file based on a request from said user.

3. An entertainment system according to claim 1, wherein said re-sampling means comprises:

selecting playback means for reproducing said audio data registered in said first file according to a playback attribute selected according to a control input entered from said manual controller.

4. An entertainment apparatus for connection to a manual controller for outputting at least a control request from the user, and audio output means for selecting and outputting one of a plurality of sound sources based on a supplied sound output command, comprising:

sampling means for selectively sampling audio data from audio output data during reproducing and registering said sampled audio data in a first file, wherein said sampling means comprises first effect applying means for applying an effect to said audio data being input from outside based on a request from said user;

re-sampling means to be selectively activated based on a request from said user for selectively re-sampling audio data from audio data registered in said first file when reproducing said audio data registered in said first file, the re-sampling means registering said re-sampled audio data in a second file, wherein said re-sampling means comprises second effect applying means for applying an effect to said audio data registered in said first file when reproducing said audio data registered in said first file;

audio data registering means for registering said audio data registered in said first file or said audio data registered in said second file based on a request from said user as one of said sound sources for said entertainment apparatus.

5. A computer readable medium storing a program and data for use in an entertainment system having an entertainment apparatus for executing various programs, at least one manual controller for entering control requests from the user into said entertainment apparatus, and audio output means for selecting and outputting one of a plurality of sound sources based on a supplied sound output command, said program comprising the steps of:

selectively sampling audio data from audio data during reproducing and registering said sampled audio data in a first file;

applying an effect to said audio data being input from outside based on a request from said user;

selectively re-sampling audio data from audio data registered in said first file when reproducing said audio data registered in said first file, and registering said re-sampled audio data in a second file;

applying an effect to said audio data registered in said first file when reproducing said audio data registered in said first file; and registering said audio data registered in said first file or said audio data registered in said second file based on a request from said user as one of said sound sources for said entertainment apparatus.

6. A computer readable medium according to claim 5, further comprising the step of: trimming said audio data registered in said first file and/or said second file based on a request from said user.

7. A computer readable medium according to claim 5, wherein said step of selectively re-sampling said audio data comprises the step of:

reproducing said audio data registered in said first file according to a playback attribute selected according to a control input entered from said manual controller.

8. A program stored on a computer readable medium that is readable and executable by a computer, for use in an entertainment system having an entertainment apparatus for executing various programs, at least one manual controller for entering control requests from the user into said entertainment apparatus, and audio output means for selecting and outputting one of a plurality of sound sources based on a supplied sound output command, said program comprising the steps of:

selectively sampling audio data from audio data during reproducing and registering said sampled audio data in a first file;

applying an effect to said audio data being input from outside based on a request from said user;

selectively re-sampling audio data from audio data registered in said first file when reproducing said audio data registered in said first file, and registering said re-sampled audio data in a second file;

applying an effect to said audio data registered in said first file when reproducing said audio data registered in said first file; and registering said audio data registered in said first file or said audio data registered in said second file based on a request from said user as one of said sound sources for said entertainment apparatus.

* * * * *